(12) United States Patent
Iwasaki

(10) Patent No.: US 7,969,662 B2
(45) Date of Patent: Jun. 28, 2011

(54) LENS BARREL UNIT AND IMAGING APPARATUS

(75) Inventor: Tetsuya Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/645,903

(22) Filed: Dec. 23, 2009

(65) Prior Publication Data

US 2010/0157440 A1 Jun. 24, 2010

(30) Foreign Application Priority Data

Dec. 24, 2008 (JP) ................................ 2008-328004

(51) Int. Cl.
*G02B 15/14* (2006.01)
*G02B 7/02* (2006.01)

(52) U.S. Cl. ........ 359/699; 359/694; 359/701; 359/704; 359/823; 359/826; 359/813; 396/73; 396/349

(58) Field of Classification Search .......... 359/694–704, 359/736, 557, 676, 813, 823–826; 396/55, 396/73, 87, 349, 448, 529
See application file for complete search history.

(56) References Cited

U.S. PATENT DOCUMENTS

| 6,853,499 | B2 | | 2/2005 | Iwasaki | |
|---|---|---|---|---|---|
| 7,580,623 | B2 | * | 8/2009 | Nuno et al. | 396/73 |
| 7,595,940 | B2 | * | 9/2009 | Nuno | 359/813 |
| 7,652,830 | B2 | * | 1/2010 | Matsui et al. | 359/704 |
| 7,773,321 | B2 | * | 8/2010 | Matsui et al. | 359/823 |
| 7,782,547 | B2 | * | 8/2010 | Nomura et al. | 359/696 |
| 7,839,579 | B2 | | 11/2010 | Iwasaki | |
| 7,852,578 | B2 | | 12/2010 | Iwasaki | |
| 7,876,508 | B2 | | 1/2011 | Iwasaki | |
| 2009/0046156 | A1 | | 2/2009 | Iwasaki | |
| 2009/0046198 | A1 | | 2/2009 | Iwasaki | |
| 2009/0066829 | A1 | | 3/2009 | Iwasaki | |
| 2010/0053780 | A1 | | 3/2010 | Iwasaki | |
| 2010/0103307 | A1 | | 4/2010 | Iwasaki | |

FOREIGN PATENT DOCUMENTS

| JP | 2006-330657 A | 12/2006 |
|---|---|---|
| JP | 2008-90201 A | 4/2008 |

\* cited by examiner

*Primary Examiner* — Loha Ben
(74) *Attorney, Agent, or Firm* — Dickstein Shapiro LLP

(57) ABSTRACT

A lens barrel unit including a lens barrel which has a plurality of lens groups and is set to a photographing state by moving at least a part of the lens groups to an object side and to a collapsed state by moving the at least the part of the lens groups to an image plane side and storing the lens groups, the lens barrel unit includes: a first supporting frame which retains at least one lens group of the lens groups; a second supporting frame which retains the first supporting frame movably in an optical axis direction of the lens barrel; a first supporting frame moving section which moves the first supporting frame in the optical axis direction of the lens barrel; and a fixed cylinder in which a main shaft which is capable of moving the second supporting frame in the optical axis direction of the lens barrel is provided.

19 Claims, 19 Drawing Sheets

LENS BARREL UNIT AND IMAGING APPARATUS

CROSS REFERENCE TO RELATED APPLICATIONS

The present invention is based on and claims priority from Japanese patent application number 2008-328004, filed Dec. 24, 2008, the disclosure of which is hereby incorporated by reference herein in its entirety.

BACKGROUND

The present invention relates to a lens barrel such that a plurality of lens groups are collapsed and stored in one state, and are moved to predetermined positions and used in another state. In particular, the present invention relates to a lens barrel unit suitable for a zoom lens where a focal length is changed by relatively moving a plurality of lens groups, and to an imaging apparatus such as a camera using the lens barrel unit as described above.

With an enhanced performance of a photographing lens such as a zoom lens which is capable of changing a focal length and a development such as miniaturizing in response to a user's request, use of an imaging apparatus such as a digital camera using a so-called collapsible-type photographing lens in which at least a part of a lens barrel is stored inside a body of the imaging apparatus except when photographing has been increased. Moreover, due to not only a request for a simple miniaturization but also a request for a further decrease in thickness, it has been becoming more important to maximally decrease a thickness of a lens barrel part in a collapsed and stored state.

As a technique in response to a request for thinning an imaging apparatus as mentioned above, a structure having a collapsed-type structure such that at least a part of a lens barrel is stored inside a body of the imaging apparatus except when photographing and a part of the lens groups is retracted and moved from a photographic optical axis when the lens barrel is collapsed and stored is used. The technique above is disclosed in Japanese patent application publication numbers 2006-330657 and 2008-90201, for example.

The structure disclosed in Japanese patent application publication number 2006-330657 makes it possible to decrease a size in an optical axis direction of a whole lens group and a thickness of a whole imaging apparatus, because a part of the lens groups is retracted from the photographic optical axis when the lens barrel is stored. Incidentally, in this case, a retraction lens group which is retracted from the optical axis performs a retraction movement and a movement in the optical axis direction on a guide shaft extending only up to a thickness of the lens barrel, therefore a maximum moving range of the retracting lens group is determined by the thickness of the lens barrel. And therefore it is necessary to increase a moving range of the lens in order to achieve a zoom lens with a higher variable magnification.

In a case of the above technique disclosed in Japanese patent application publication number 2006-330657, in order to increase a moving range of a retraction lens group, it is necessary to increase a thickness of a lens barrel. Therefore, it is difficult to decrease a thickness without changing a variable magnification.

On the other hand, Japanese patent application publication number 2008-90201 discloses a structure which moves a retraction lens frame including two parts of a holding cylinder part which holds a lens group movably in the optical axis direction, and a lever part which moves the holding cylinder part to move the lens group in the optical axis direction. In particular, structures disclosed as embodiments 3 and 4 of Japanese patent application publication number 2008-90201 make it possible to increase a maximum moving range of a third lens group serving as a retraction lens by a simple structure.

In the structures disclosed in Japanese patent application publication number 2008-90201, one end part of a lever which pushes out the lens group contacts a fixed cylinder when moving maximally, so that the lever rotates and the maximum moving range is ensured. In the method above, a movement of the retraction lens group is performed in a photographing range, so that a position in the optical axis direction of the retraction lens largely depends on a rotation angle of the lever and a variability of a contact position. A position deviation in the optical axis direction that displaces an image forming position causes an out-of-focus condition. In addition, the lever rotates in a vicinity of a maximum moving position in the optical axis direction of the retraction lens group, and this position is a position where a biasing force of a compression torsion spring in the optical axis direction which biases the retraction lens group is approximately maximum. In this position, if a rotation force to further rotate the lever is added, a drive force which is necessary for the movement in the optical axis direction of the retraction lens group is further increased.

SUMMARY

An object of the present invention is to provide a lens barrel unit and an imaging apparatus which are capable of having a high variable magnification by ensuring a moving range of at least one lens group movable in an optical axis direction without increasing a thickness in the optical axis direction, and improving an optical performance by suppressing a variability of a position of the lens group.

To achieve the object of the present invention, an embodiment of the present invention provides: a lens barrel unit including a lens barrel which has a plurality of lens groups and is set to a photographing state by moving at least a part of the lens groups to an object side and to a collapsed state by moving the at least the part of the lens groups to an image plane side and storing the lens groups, the lens barrel unit comprising: a first supporting frame which retains at least one lens group of the lens groups; a second supporting frame which retains the first supporting frame movably in an optical axis direction of the lens barrel; a first supporting frame moving section which moves the first supporting frame in the optical axis direction of the lens barrel; and a fixed cylinder in which a main shaft which is capable of moving the second supporting frame movably in the optical axis direction of the lens barrel is provided.

Preferably, the first supporting frame moving section has a contacting projection which is provided in the first supporting frame in a direction perpendicular to the optical axis direction of the lens barrel; a lever rotating shaft which is provided in the second supporting frame in a direction perpendicular to the optical axis direction of the lens barrel; a lever having an intermediate part which is retained rotatably by the lever rotating shaft, an upper end at which a contacting part which contacts the contacting projection is provided, and a lower end at which a cam follower which is provided in a direction perpendicular to the optical axis direction of the lens barrel is provided; and a cam face which is provided in the fixed cylinder and has an inclined face which contacts the cam follower and is inclined to the optical axis direction of the lens barrel, wherein in a case where the second supporting frame moves in the optical axis direction of the lens barrel, the cam follower slides on the inclined face and the lever rotates around the lever rotating shaft, and the contacting projection which contacts the contacting part moves in the optical axis direction of the lens barrel and the first supporting frame, in which the contacting projection is provided, moves in the optical axis direction of the lens barrel.

Preferably, in a case where the lens group retained by the first supporting frame is set to the photographing state from the collapsed state, the cam follower slides on the inclined face.

Preferably, the contacting projection is biased to the object side in the optical axis direction of the lens barrel by a first biasing member which is provided in the lever, and the lever is biased to an image plane side in the optical axis direction of the lens barrel by a second biasing member provided in the second supporting frame.

Preferably, in the second supporting frame, a retainer plate, which controls a movement of the first supporting frame to the object side in the optical axis direction of the lens barrel by contacting the second supporting frame, is provided, and in a case where the first supporting frame contacts the retainer plate, a contact between the contacting projection and the contacting part is released.

Preferably, a locking part is provided on the image plane side of the contacting part to interpose the contacting projection.

Preferably, the cam follower is located closer to the object side than to the lever rotating shaft, and the inclined face has a shape such that a distance from the optical axis of the lens barrel becomes larger from the image plane side toward the object side.

Preferably, the cam face is provided in the fixed cylinder, and has a flat face where the cam follower contacts and which includes the optical axis direction of the lens barrel and a direction perpendicular to the lever and is continued with the object side of the inclined face.

Preferably, in the photographing state, the cam follower slides only on the flat face.

Preferably, in the photographing state where a moving range of a lens group performing a focusing of the lens groups is smallest, the cam follower slides on the inclined face.

Preferably, in a case where the lens group retained by the first supporting frame is in the collapsed state, the cam follower is spaced from the cam face.

Preferably, the lens group retained by the first supporting frame is a lens group which performs a focusing of a whole of the lens groups by a movement in the optical axis direction of the lens barrel.

Preferably, the lens barrel unit further comprises: a second moving section which retracts the lens group retained by the first supporting frame from the optical axis of the lens barrel.

Preferably, the second moving section has: a retraction cam part which is provided at a lower end of the second supporting frame and a retraction cam face is provided on a surface; a lead screw which is provided parallel to the main shaft below the main shaft; a drive gear which drives the lead screw; and a nut with a cam follower which is screwed in the lead screw and engages with the retraction cam face, wherein in a case where the lead screw is rotated by the drive gear, with a movement of the nut in the optical axis direction of the lens barrel, the cam follower moves on the retraction cam face, so that the second supporting frame where the retraction cam part is provided rotates around the main shaft in a plane perpendicular to the optical axis direction of the lens barrel.

Preferably, in a case where the lens group retained by the first supporting frame is set to the photographing state from the collapsed state, the second moving section rotates the first supporting frame such that the lens group retained by the first supporting frame is set to the photographing state where the lens group retained by the first supporting frame is on the optical axis from the retracted state where the lens group retained by the first supporting frame is not on the optical axis, and in a case where the lens group retained by the first supporting frame is set to the collapsed state from the photographing state, the second moving section rotates the first supporting frame such that the lens group retained by the first supporting frame is set to the retracted state where the lens group retained by the first supporting frame is not on the optical axis from the photographing state where the lens group retained by the first supporting frame is on the optical axis.

Preferably, a nut engaging part in which the cam follower contacts is provided on the object side of the retraction cam part, and in a case where the lens group retained by the first supporting frame is in the photographing state, the cam follower contacts the nut engaging part.

Preferably, after the lens group retained by the first supporting frame is in the photographing state, in a case where the nut moves to the object side, the nut engaging part is pushed by the cam follower to the object side, and the second supporting frame moves to the object side.

Preferably, a third biasing member which biases the second supporting frame to the image plane side is provided.

Preferably, an imaging apparatus comprises the above lens barrel unit.

DETAILED DESCRIPTION OF THE PREFERRED EMBODIMENTS

Hereinafter, a lens barrel unit and an imaging apparatus of the present invention will be explained with reference to the drawings.

FIGS. 1 to 7 illustrate a structure of a chief part of a lens barrel unit used for an optical system of an imaging apparatus according to an embodiment of the present invention.

Figure 1:
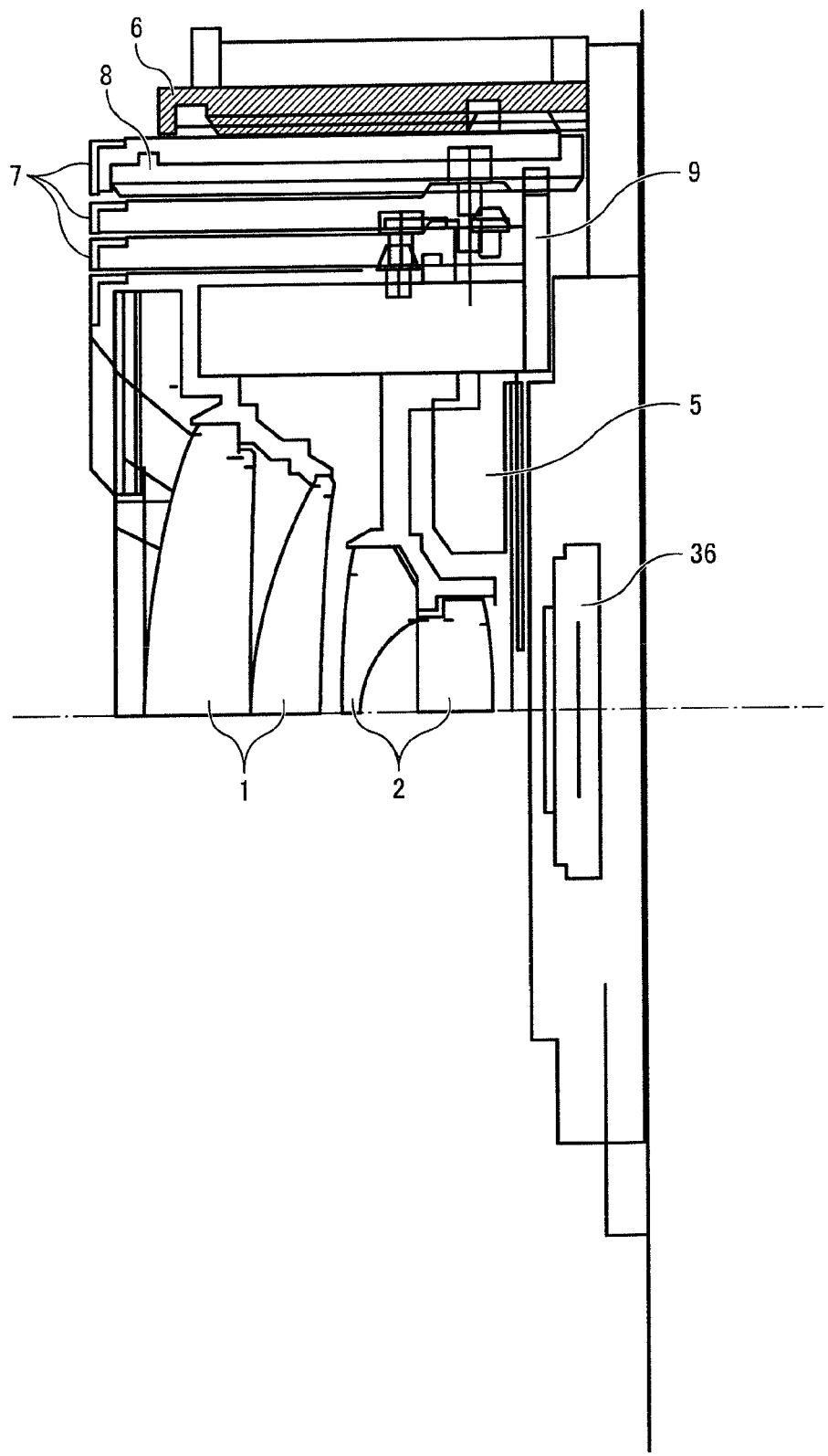
FIG. 1 is a vertical cross-sectional view of a lens barrel unit according to an embodiment of the present invention in a retracted and stored state.
Figure 2:
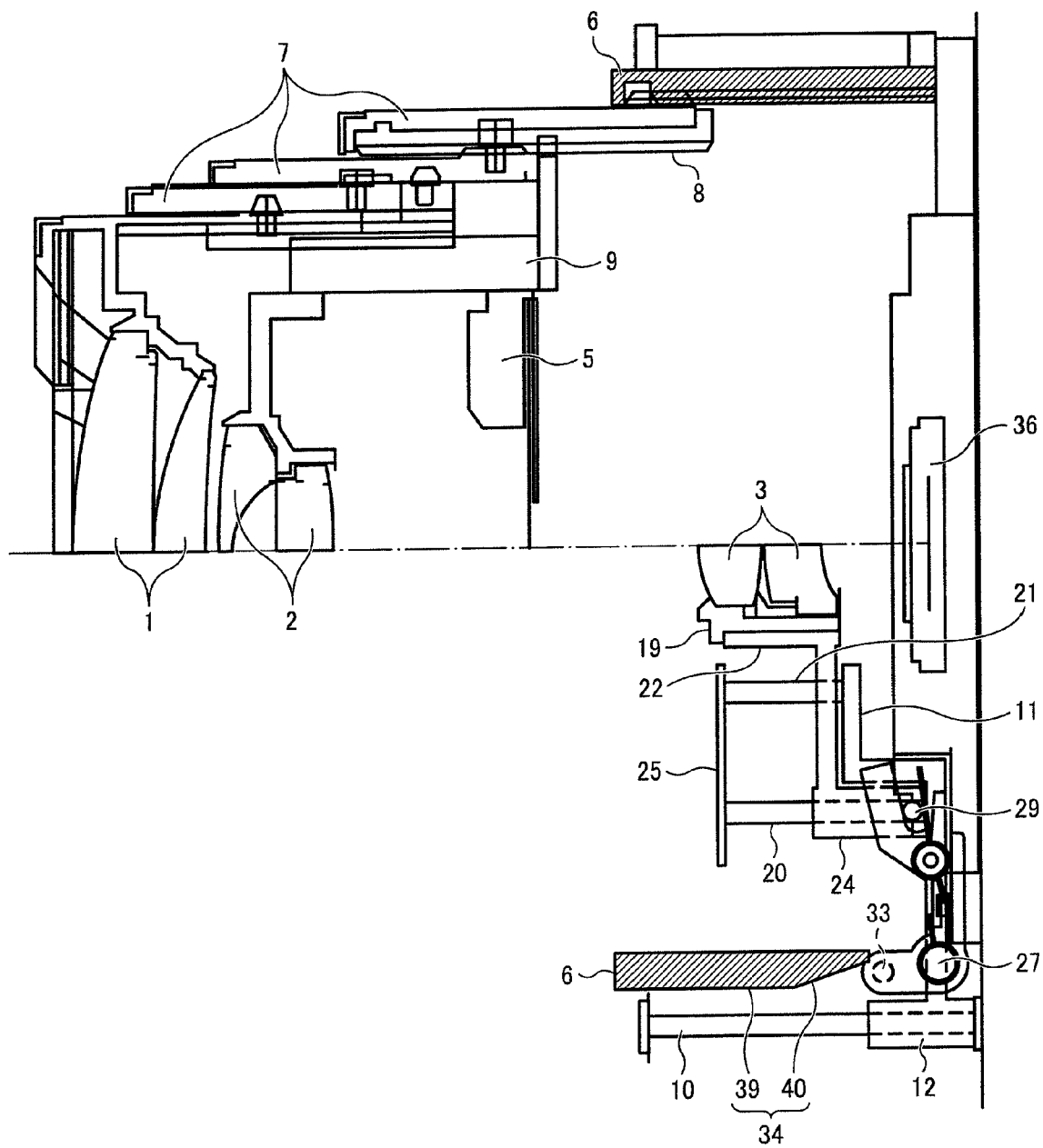
FIG. 2 is a vertical cross-sectional view of a lens barrel unit of FIG. 1 after starting an imaging apparatus.
Figure 3:
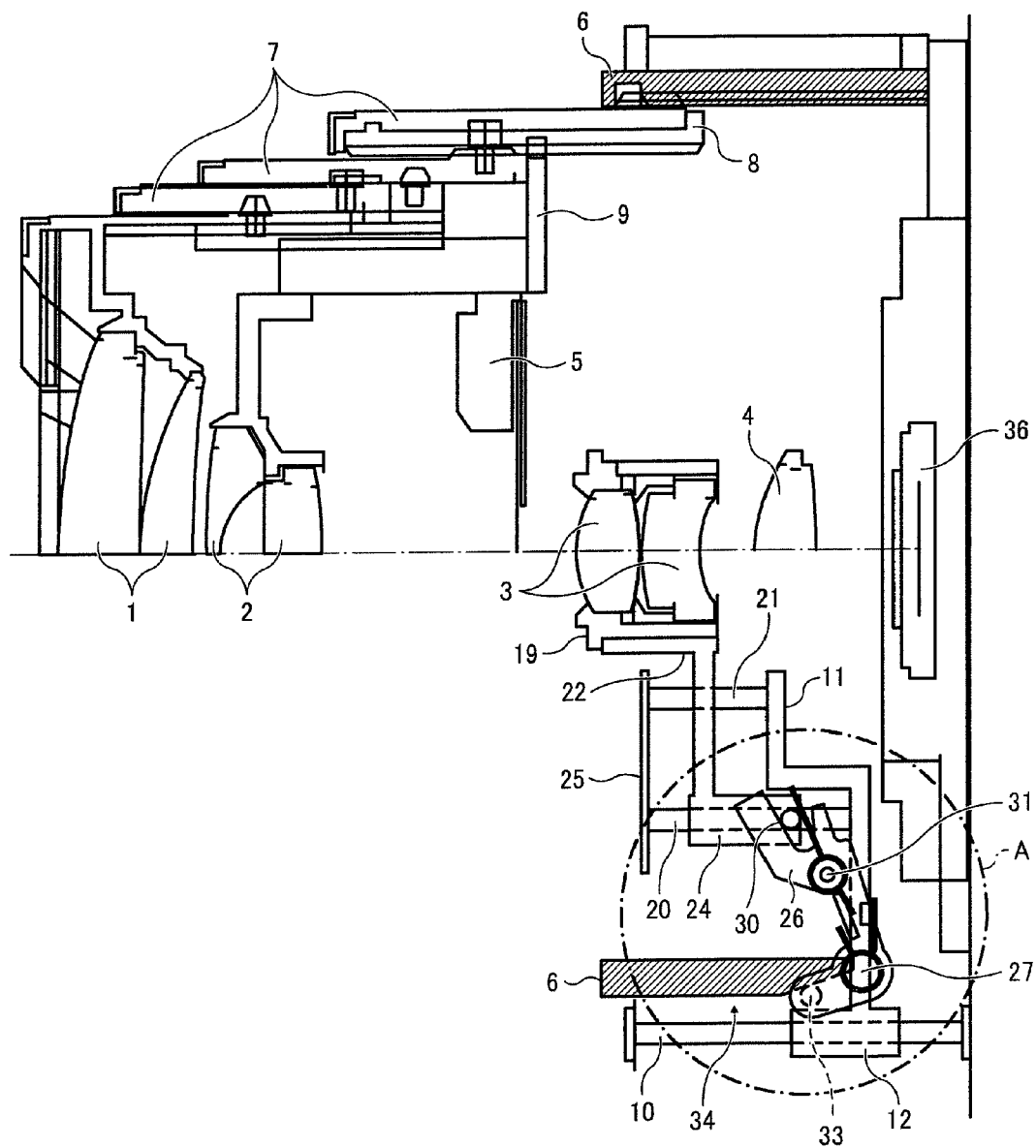
FIG. 3 is a vertical cross-sectional view of the lens barrel unit in a wide-angle state and in a state where a cam follower 33 of a lever 26 contacts an inclined face 40 of cam part of a cam face 34.
Figure 4:
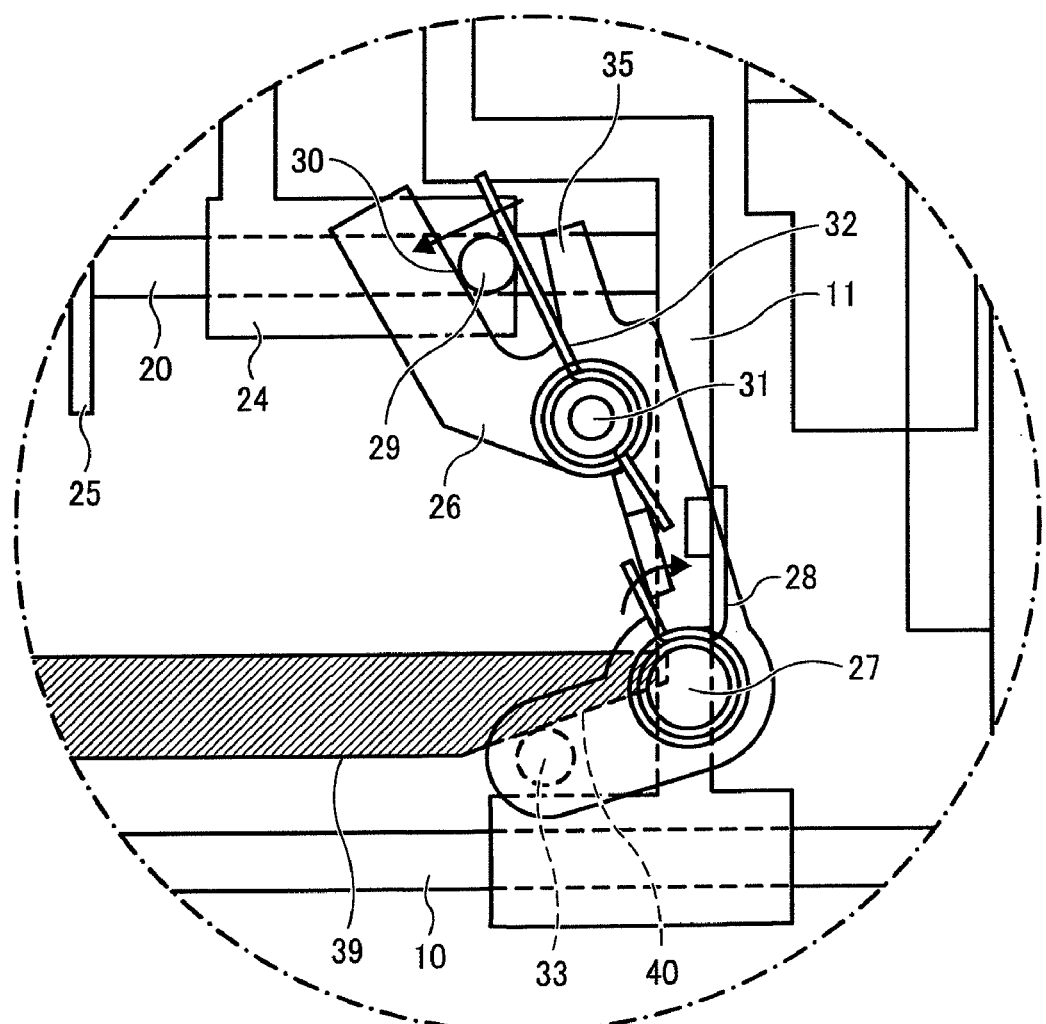
FIG. 4 is a detailed view of an A part of FIG. 3.
Figure 5:
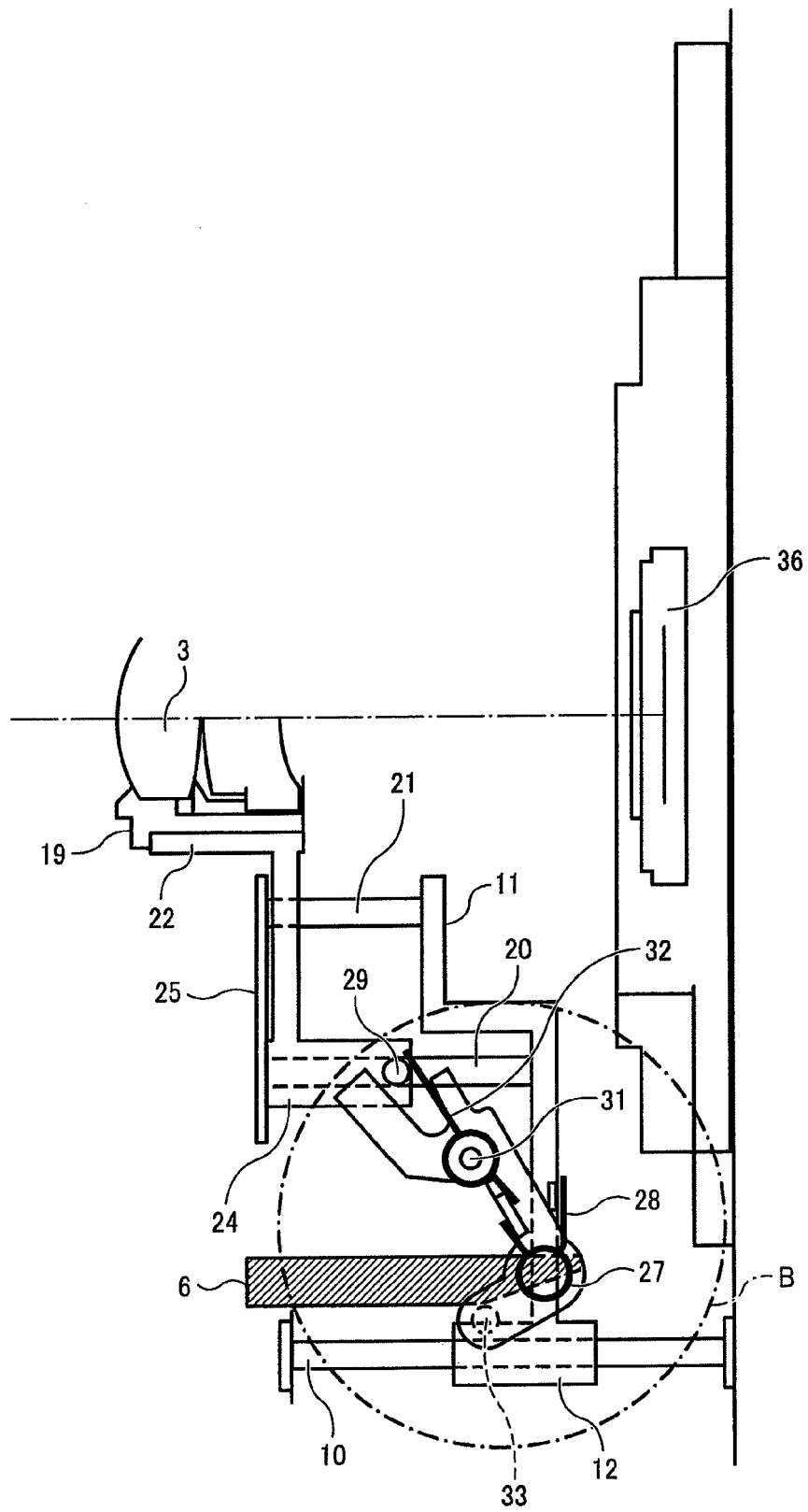
FIG. 5 is a vertical cross-sectional view of the lens barrel unit in the wide-angle state and in a state where the cam follower 33 of the lever 26 contacts a face 39 parallel to an optical axis of the cam face 34.
Figure 6:
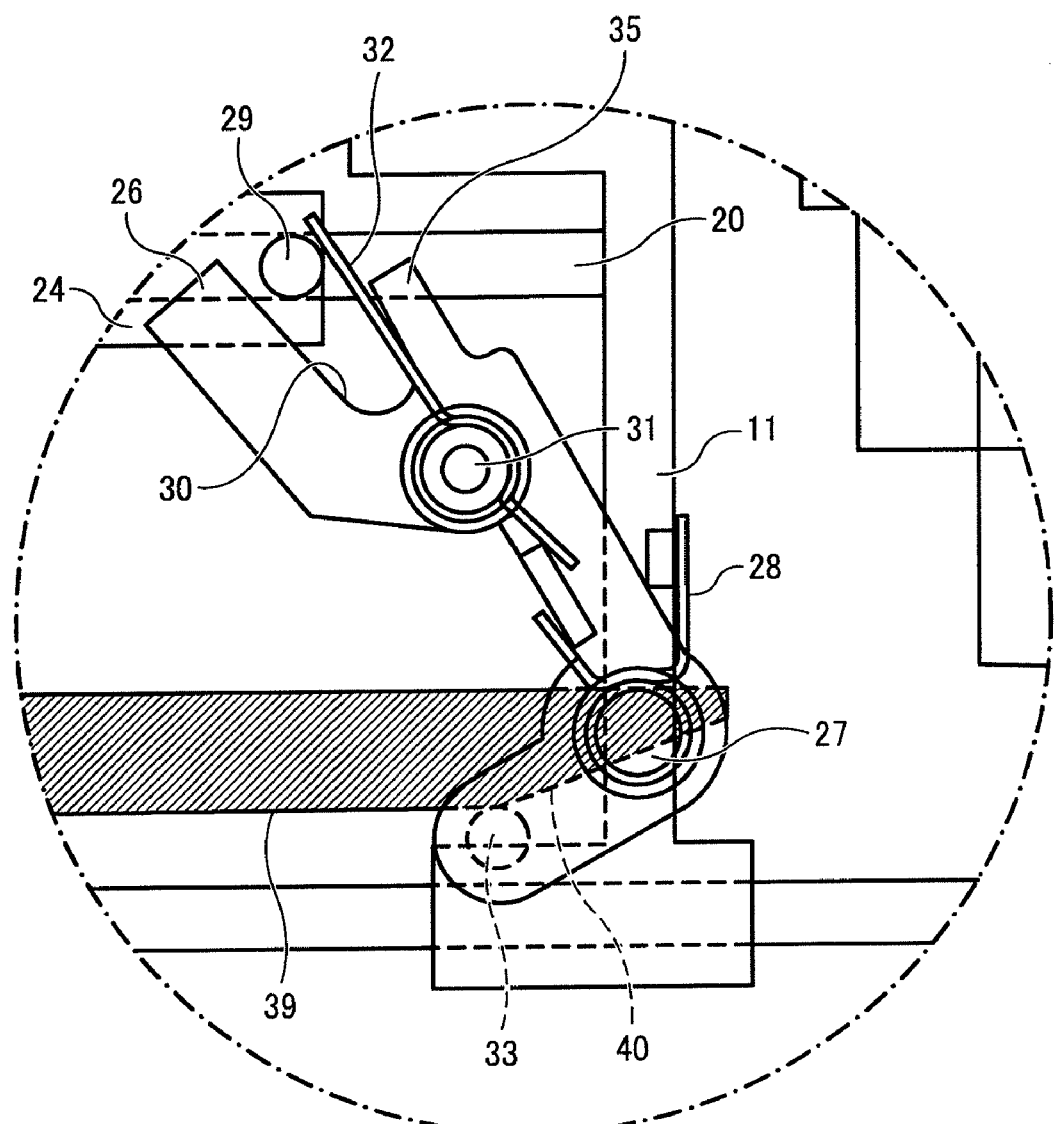
FIG. 6 is a detailed view of an A part of FIG. 5.
Figure 7:
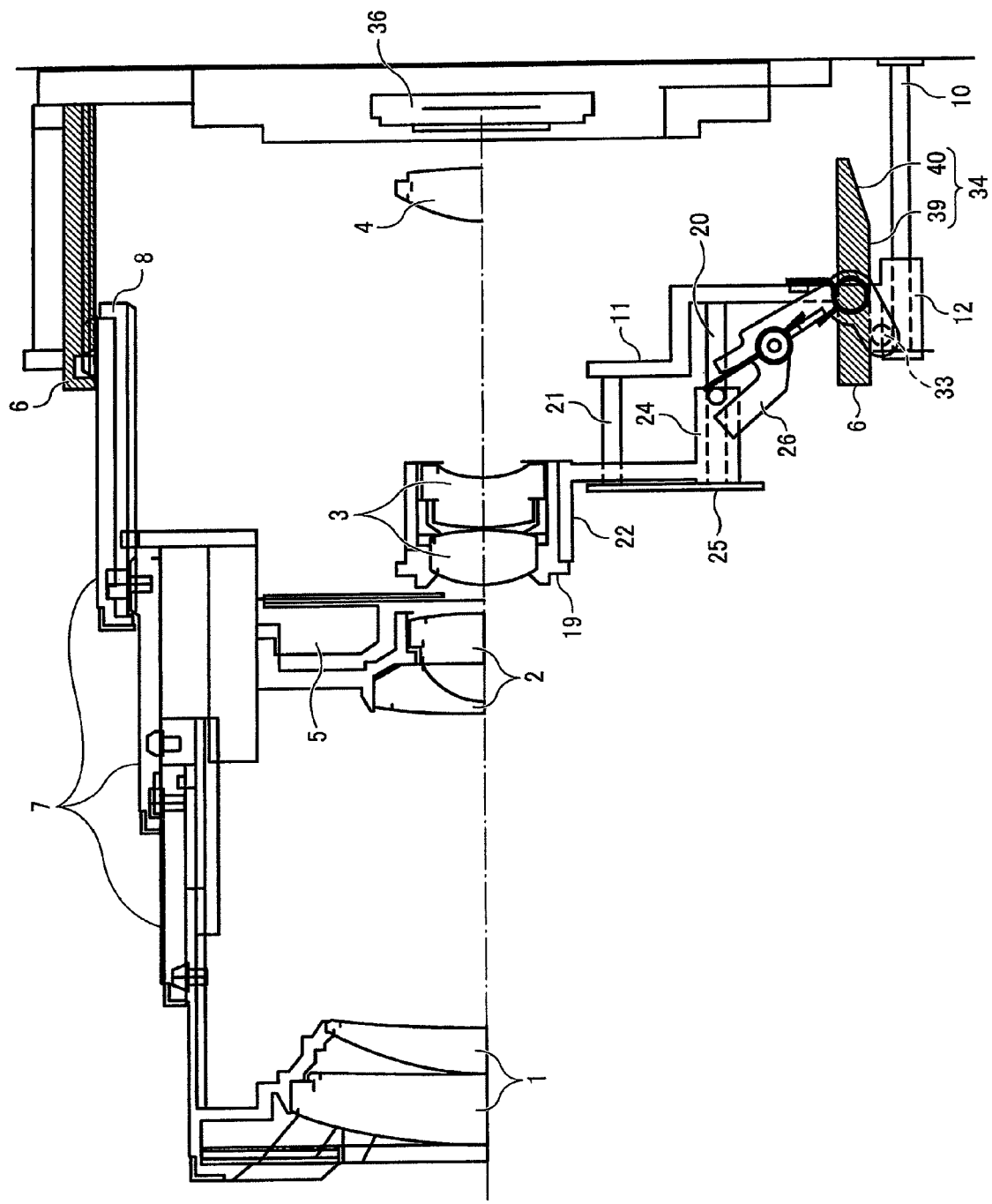
FIG. 7 is a vertical cross-sectional view of the lens barrel unit of FIG. 1 in a telephoto state.

FIG. 1 is a vertical cross-sectional view of a lens barrel unit according to an embodiment of the present invention in a collapsed and stored state. FIG. 2 is a vertical cross-sectional view of the lens barrel unit of FIG. 1 after starting the lens barrel unit. FIG. 3 is a vertical cross-sectional view of the lens barrel unit of FIG. 1 in a wide-angle (that is, short focal length) state and in a state where a cam follower 33 contacts an inclined face 40 of cam part of a cam face 34. FIG. 4 is a detailed view of an A part of FIG. 3. FIG. 5 is a vertical cross-sectional view of the lens barrel unit of FIG. 1 in the wide-angle state and in a state where the cam follower 33 contacts a face 39 parallel to an optical axis of the cam face 34. FIG. 6 is a detailed view of a B part of FIG. 5. FIG. 7 is a vertical cross-sectional view of the lens barrel unit of FIG. 1 in a telephoto (that is, long focal length) state.

Figure 8:
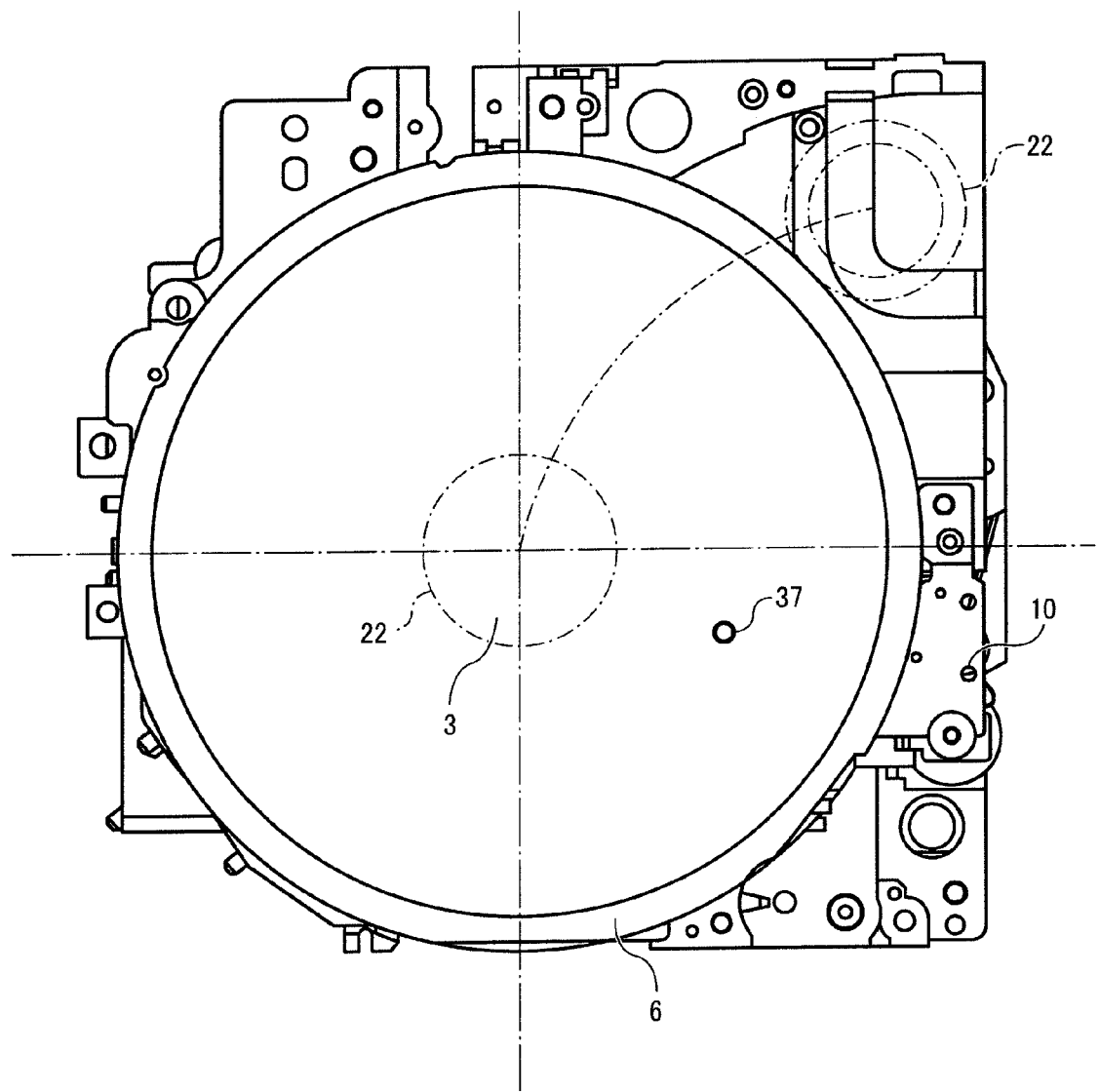
FIG. 8 illustrates a trajectory of a retracting movement of a third lens group 3 in the lens barrel unit of FIG. 1 and a positional relationship of a main shaft 10 for third lens group and a second shaft 37 for third lens group etc., and is a front view of a fixed cylinder 6 viewed from an object side.

The lens barrel unit illustrated in FIGS. 1 to 18 is provided with a first lens group 1, a second lens group 2, a third lens group 3, a fourth lens group 4, a shutter unit with an aperture function 5, a fixed cylinder 6, a plurality of rotating cylinders 7, a straight movement guide cylinder 8, a main shaft 10 for third lens group (main shaft), a second supporting frame 11 of third lens group (second supporting frame), a compression torsion spring 14 (third biasing member) (FIG. 14), a nut 15 with a cam follower 15a, a lead screw 16, a drive gear 17 of third lens group (drive gear), a third lens group holder 19, a main shaft 20 for first supporting frame of third lens group, a second shaft 21 for first supporting frame of third lens group, a first supporting frame 22 of third lens group (first supporting frame), a sleeve part 24 of first supporting frame of third lens group, a retainer plate 25, a lever 26, a lever rotating shaft 27, a first torsion spring 28 (second biasing member), a contacting projection 29, a contacting part 30, a retaining shaft 31 of second torsion spring, a second torsion spring 32 (first biasing member), a cam follower 33, an image sensor 36, and a second shaft 37 for third lens group (FIG. 8).

The second supporting frame 11 of the third lens group has a sleeve part 12 of the second supporting frame of the third lens group and a retraction cam part 13 for the third lens group (retraction cam part). The retraction cam part 13 for the third lens group is provided with a nut engaging part 18 for the third lens group (nut engaging part) and a retraction cam face 38 for third lens group (retraction cam face). The fixed cylinder 6 has a cam face 34, and the cam face 34 is formed by a face 39 parallel to an optical axis (flat face) and an inclined face 40 of cam part (inclined face) where a distance from the optical axis is gradually spaced.

The contacting projection 29, the lever 26, the lever rotating shaft 27, the contacting part 30, the cam follower 33, the cam face 34, the face 39 parallel to the optical axis, and the inclined face 40 of the cam part constitute a first supporting frame moving section.

And the main shaft 10 for the third lens group, the retraction cam part 13 for the third lens group, the nut 15 with the cam follower 15a, the lead screw 16, the drive gear 17 of the third lens group, the nut engaging part 18 for the third lens group, the retraction cam face 38 for the third lens group constitute a second moving section.

The lens barrel unit includes a lens barrel in which a plurality of lens groups are provided, and the plurality of the lens groups move with a movement of the lens barrel.

In the lens barrel unit where its chief part is illustrated in FIGS. 1 to 7, an optical system of the lens barrel unit, in a photographing state, as illustrated in FIGS. 3 and 7, comprises the first lens group 1 having a positive power (refracting power), the second lens group 2 having a negative power, the third lens group 3 having a positive power and the fourth lens group 4 having a positive power, which are disposed from an object side in order. Between the second lens group 2 and the third lens group 3, an aperture function which controls a ray bundle and the shutter unit 5 having the aperture function are disposed. The optical system is structured as a zoom lens such that a focal length is changed by changing mutual intervals between the first lens group 1, the second lens group 2 and the third lens group 3, and focusing is performed by moving the fourth lens group 4.

The first lens group 1, the second lens group 2 and the shutter unit 5 moves forward and backward along the optical axis by the plurality of the rotating cylinders 7 and the straight movement guide cylinder 8 retained by the fixed cylinder 6, when a rotational force is given to the rotating cylinders 7. And the first lens group 1, the second lens group 2 and the shutter unit 5 are capable of moving to a predetermined position by a cam groove or a cam cylinder 9 provided in the rotating cylinders 7. The third lens group 3 and the fourth lens group 4, when stored, are rotated around each main axis as a center and retracted outside of the rotating cylinders 7. By being retracted as described above, a thickness of a whole lens barrel when stored, as illustrated in FIG. 1, can be a total of each thickness of the first lens group 1, the second lens group 2, the shutter unit 5 and the image sensor 36, and thereby it is possible to reduce the thickness of the whole lens barrel unit.

Figure 9:
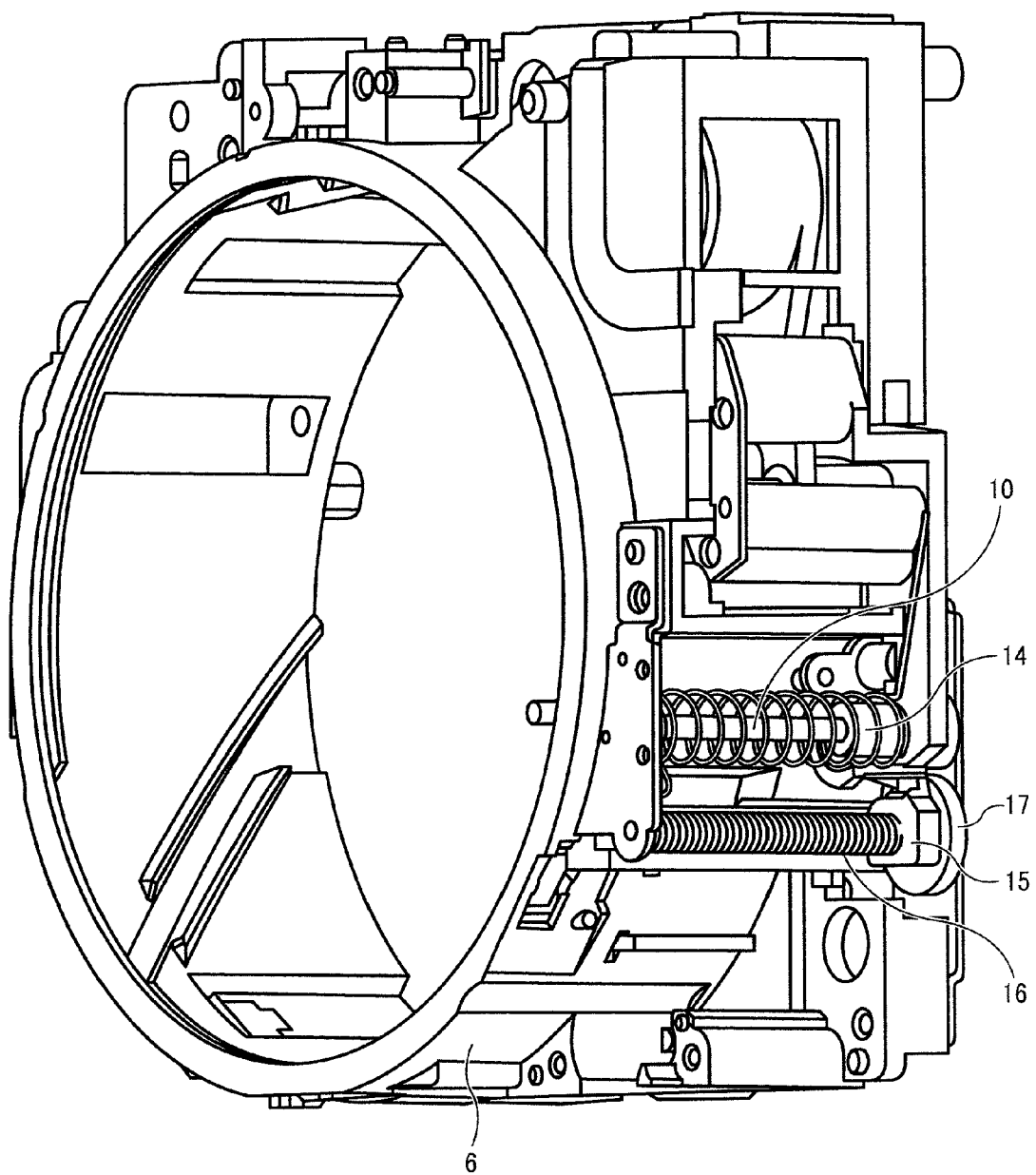
FIG. 9 is a perspective view illustrating a state of the fixed cylinder 6 and a drive supporter of the third lens group 3 where the third lens group 3 in the lens barrel unit of FIG. 1 is in the retracted and stored state.
Figure 10:
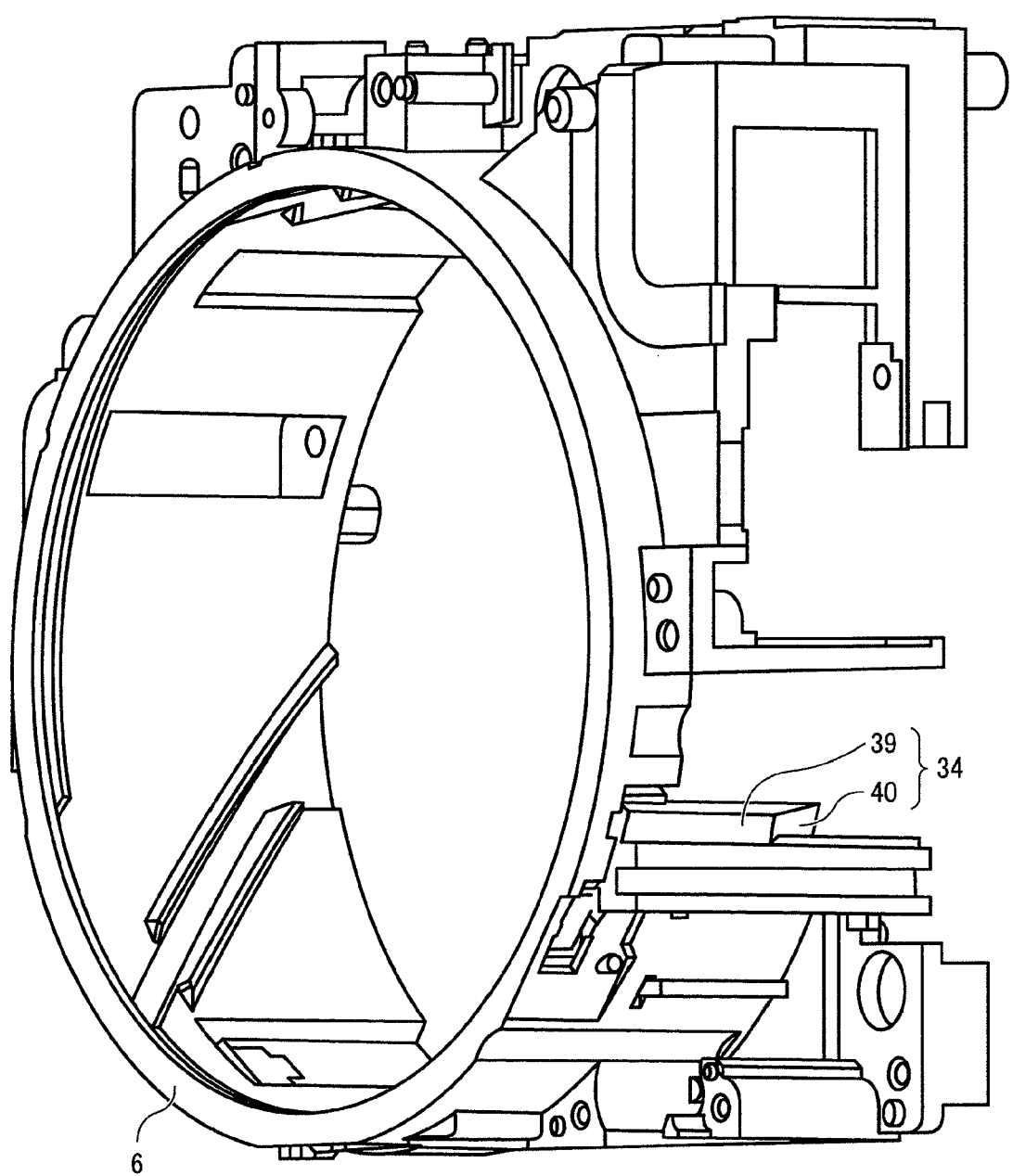
FIG. 10 is a perspective view illustrating the fixed cylinder 6 having the cam face 34 in the lens barrel unit of FIG. 1.
Figure 11:
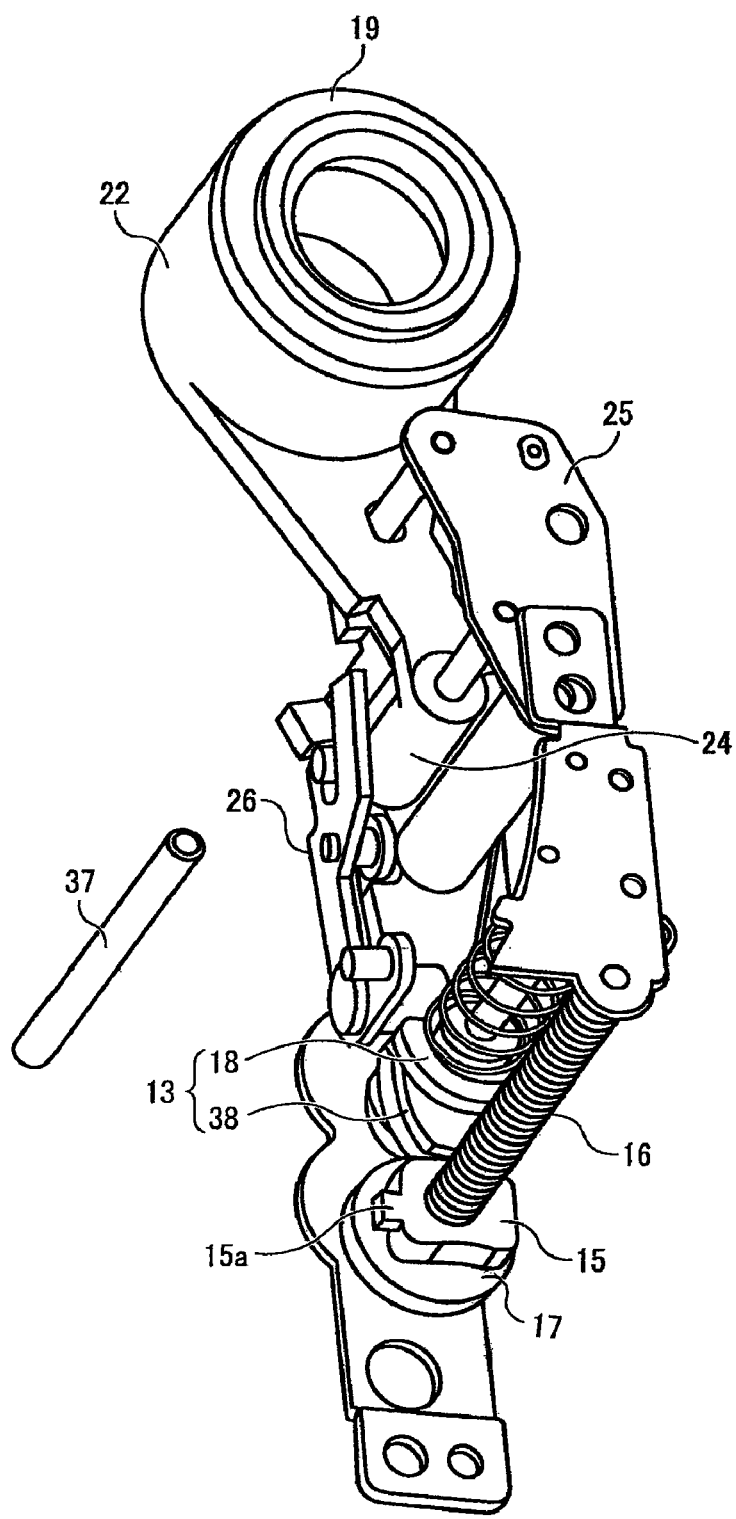
FIG. 11 is a perspective view illustrating a state of the drive supporter of the third lens group 3 where the third lens group 3 in the lens barrel unit of FIG. 1 is in the retracted and stored state.
Figure 12:
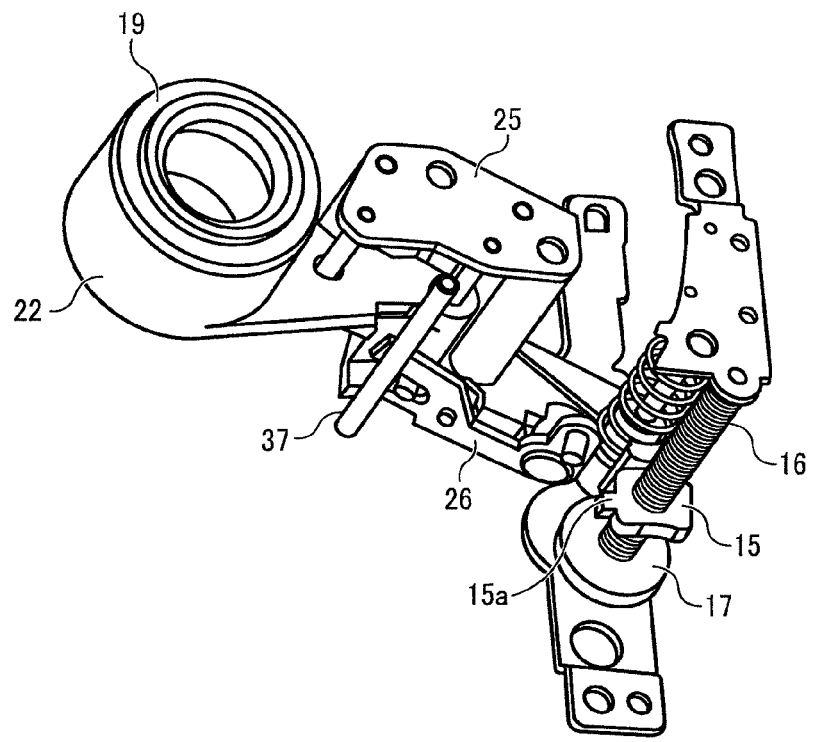
FIG. 12 is a perspective view illustrating a state of the drive supporter of the third lens group 3 where the third lens group 3 in the lens barrel unit of FIG. 1 is in a state of entering on the optical axis.
Figure 13:
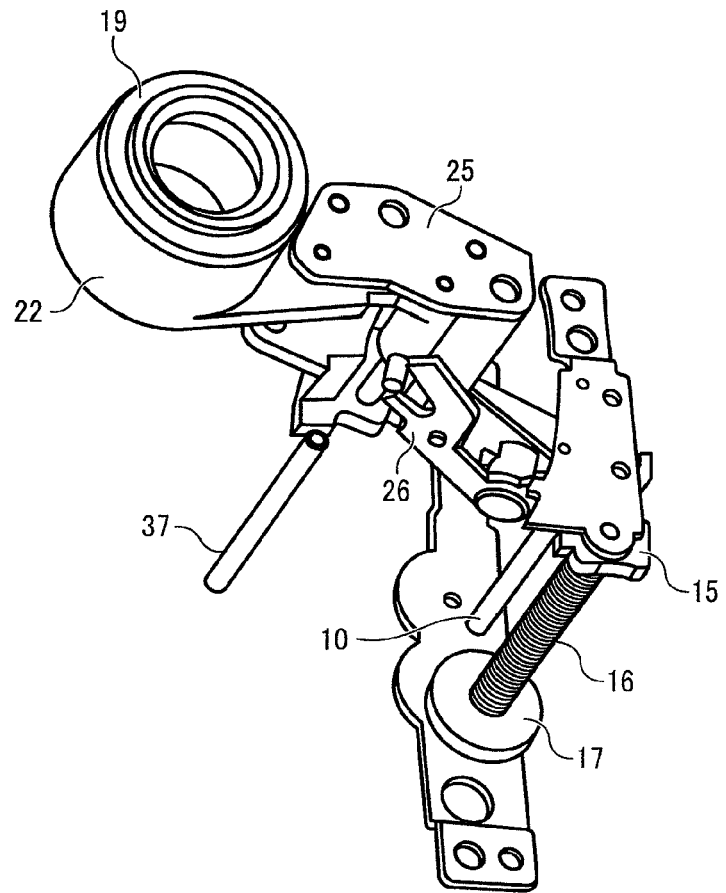
FIG. 13 is a perspective view illustrating a state of the drive supporter of the third lens group 3 where the third lens group 3 in the lens barrel unit of FIG. 1 is on the optical axis and in a state of being located in a telephoto position.
Figure 14:
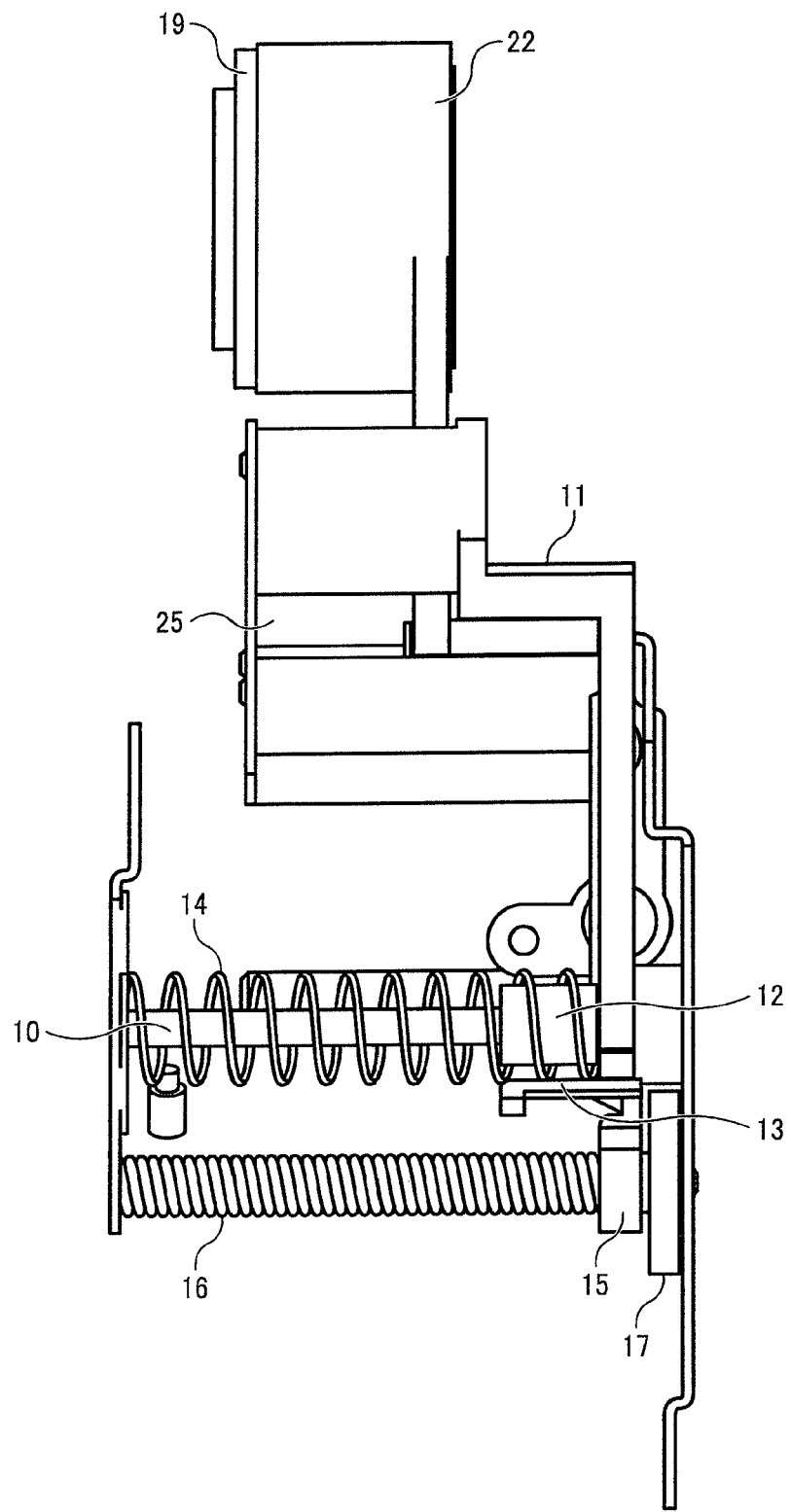
FIG. 14 is a side view illustrating a state of the drive supporter of the third lens group 3 where the third lens group 3 in the lens barrel unit of FIG. 1 is in the retracted and stored state.
Figure 15:
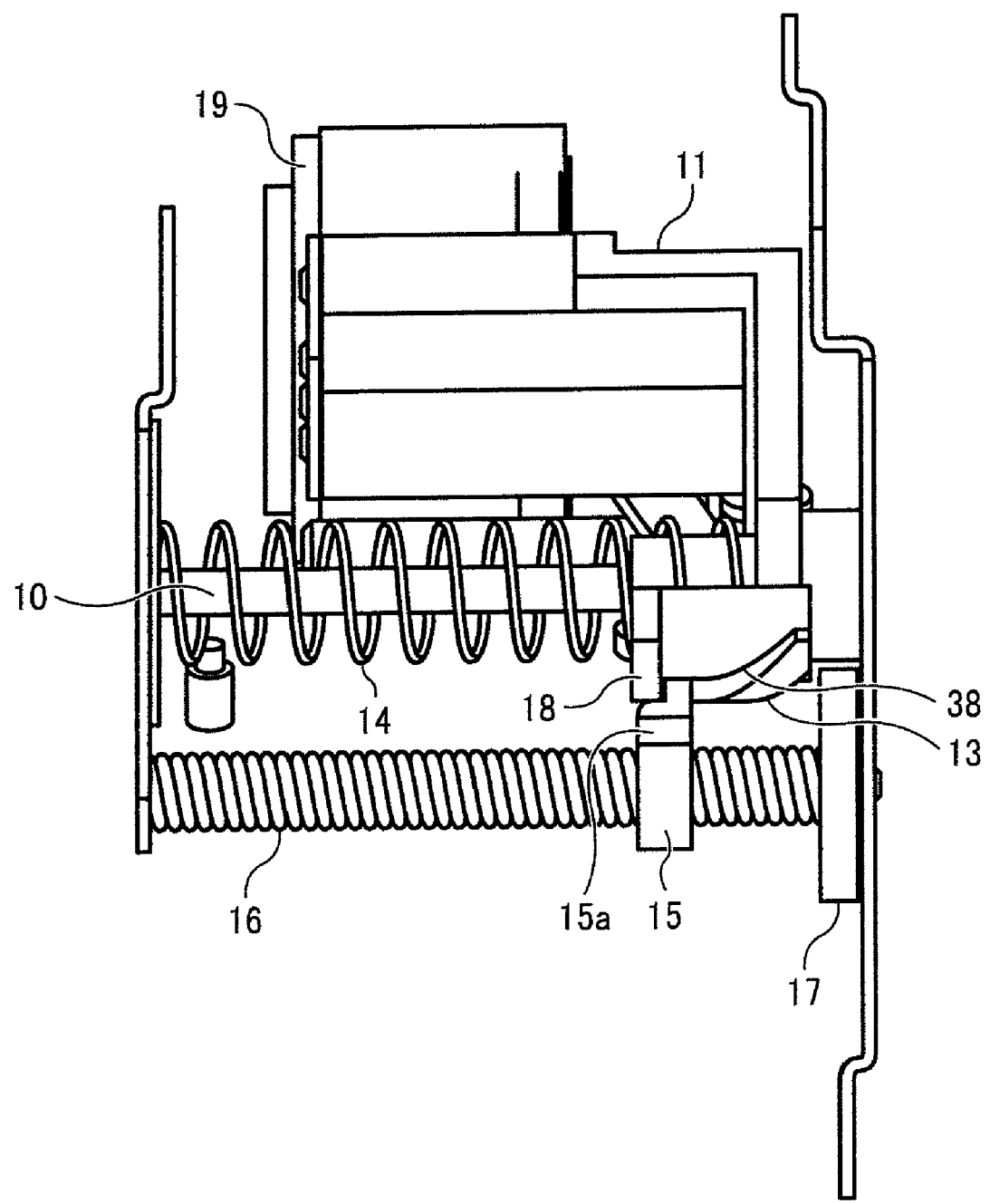
FIG. 15 is a side view illustrating a state of the drive supporter of the third lens group 3 where the third lens group 3 in the lens barrel unit of FIG. 1 is in the state of entering on the optical axis.
Figure 16:
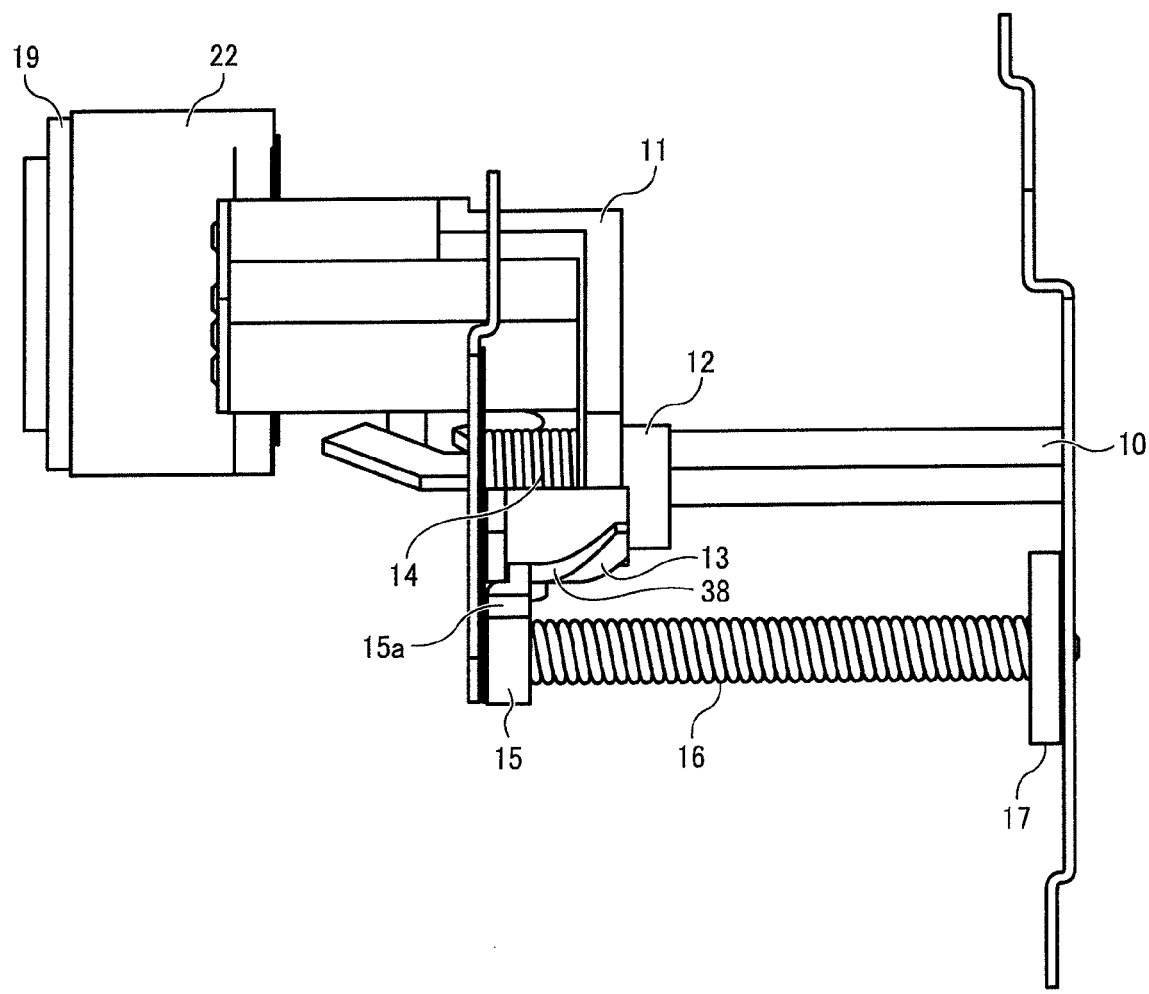
FIG. 16 is a side view illustrating a state of the drive supporter of the third lens group 3 where the third lens group 3 in the lens barrel unit of FIG. 1 is on the optical axis and in the state of located in the telephoto position.

Here, taking the third lens group 3 as an example, a retraction mechanism of the third lens group 3 and the fourth lens group 4 will be explained with reference to FIGS. 1 to 18. FIG. 8 is a front view of the fixed cylinder 6 from the object side, that is, a front of the lens barrel unit, and illustrates a trajectory of a retracting movement of the third lens group 3, and a positional relationship of the main shaft 10 for the third lens group and the second shaft 37 for the third lens group etc. FIG. 9 is a perspective view illustrating the fixed cylinder 6 and a drive supporter of the third lens group 3 where the third lens group 3 is in the retracted and stored state. FIG. 10 is a perspective view of the fixed cylinder 6 having the cam face 34. FIGS. 11 to 13 are perspective views illustrating the drive supporter of the third lens group 3 where the third lens group 3 is located in various positions. FIG. 11 is a perspective view illustrating the drive supporter of the third lend group 3 where the third lens group 3 is in the retracted and stored state. FIG. 12 is a perspective view illustrating the drive supporter of the third lens group 3 where the third lens group 3 is in a state of entering on the optical axis (photographing state). FIG. 13 is a perspective view illustrating the drive supporter of the third lens group 3 where the third lens group 3 is in a state of entering on the optical axis (photographing state) and being located in a telephoto position. FIGS. 14 to 16 are side views of the drive supporter of the third lens group 3 viewed from a side where the third lens group 3 is in a position corresponding to each of FIGS. 11 to 13. That is, FIG. 14 is a side view illustrating the drive supporter of the third lens group 3 where the third lens group 3 is in the retracted and stored state. FIG. 15 is a side view illustrating the drive supporter of the third lens group 3 where the third lens group 3 is in the state of entering on the optical axis. FIG. 16 is a side view illustrating a state of the drive supporter of the third lens group 3 where the third lens group 3 is on the optical axis and in the state of being located in the telephoto position.

Figure 17:
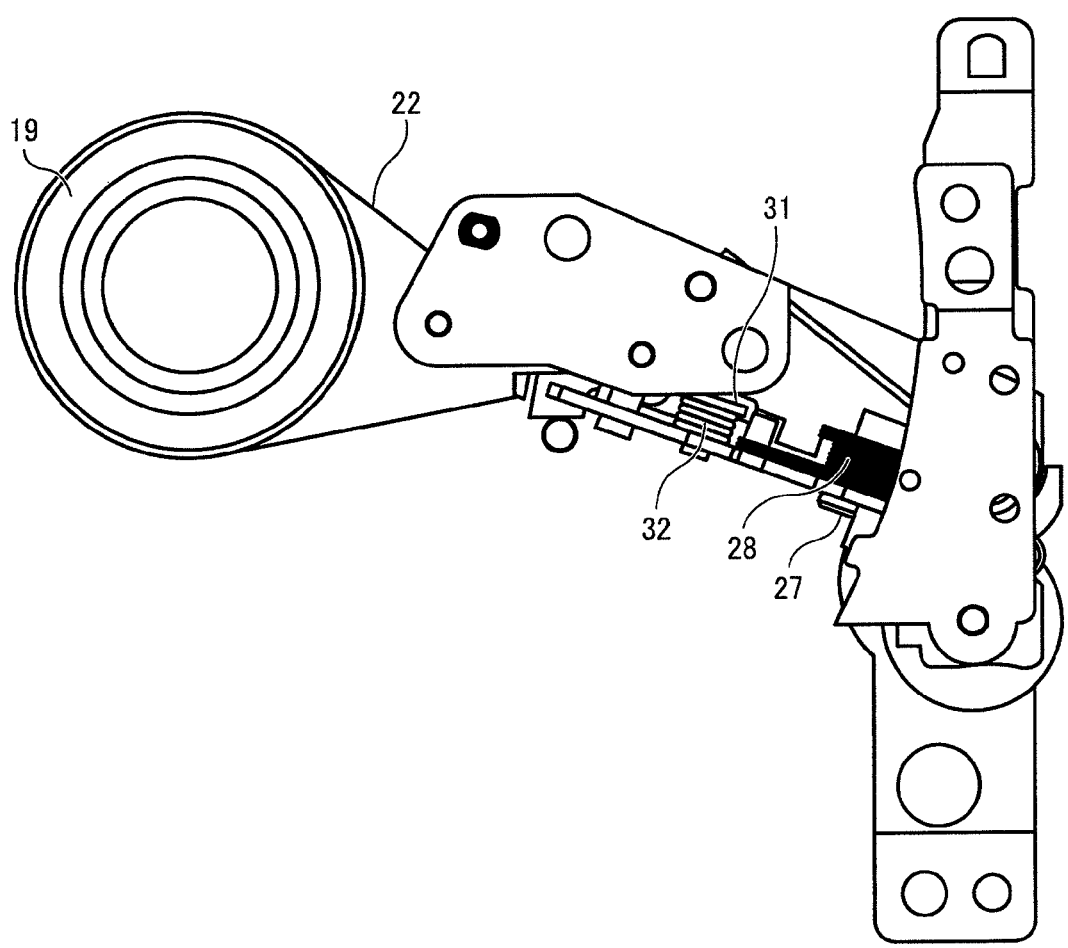
FIG. 17 is a front view from the object side illustrating a state of the drive supporter of the third lens group 3 where the third lens group 3 in the lens barrel unit of FIG. 1 is in the state of entering on the optical axis.
Figure 18:
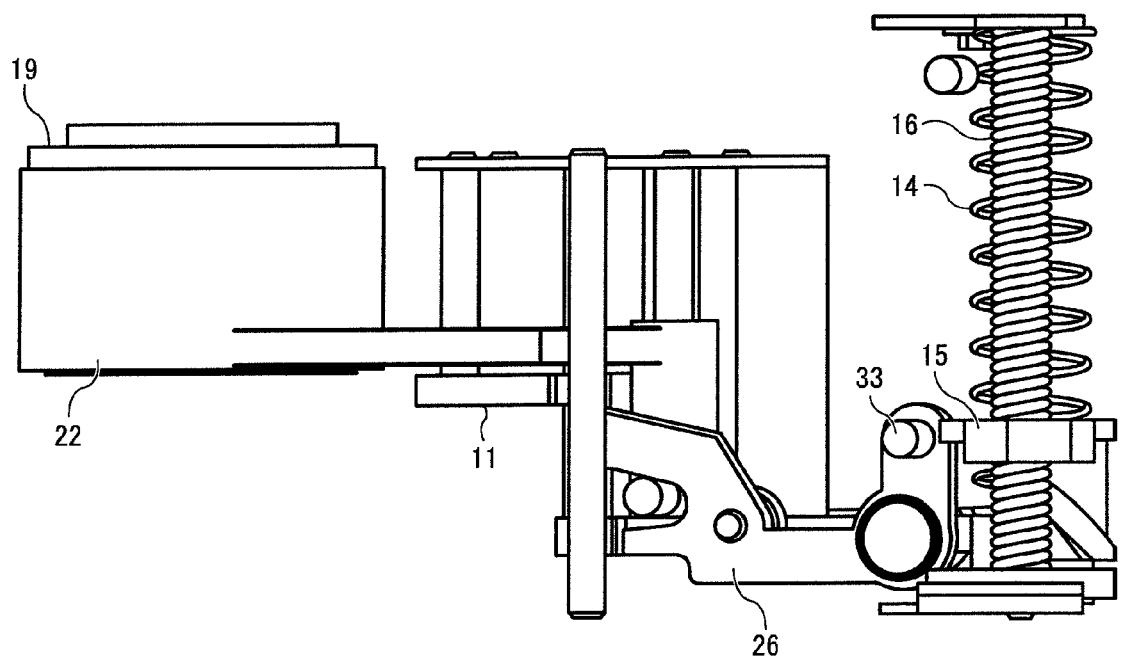
FIG. 18 is a side view illustrating a state of the drive supporter of the third lens group 3 viewed from a lower side in FIG. 8 in the state of FIG. 17 where the third lens group 3 in the lens barrel unit of FIG. 1 is in the state of entering on the optical axis.

Moreover, FIG. 17 is a front view from the object side illustrating the drive supporter of the third lens group 3 where the third lens group 3 is in the state of entering on the optical axis. FIG. 18 is a bottom view of the drive supporter illustrated in FIG. 17.

In FIGS. 1 to 18, the third lens group 3, when moving to the object side, as illustrated in FIGS. 2 to 7, enters on the optical axis and is located on the same optical axis as the other lens groups. When stored, as illustrated in FIG. 8, the third lens group 3 rotates around the main shaft 10 for the third lens group as the center, and is retracted in an upper right space of the fixed cylinder 6 viewed from the front of the object side of the lens barrel unit. The third lens group 3, as illustrated in FIGS. 2 to 7, is retained by the second supporting frame 11 of the third lens group fitting in the main shaft 10 for the third lens group. In the second supporting frame 11 of the third lens group, the sleeve part 12 of the second supporting frame of the third lens group which is fitted rotatably in the main shaft 10 for the third lens group, and a partially cylinder-shaped retraction cam part 13 for the third lens group which is located outside of the sleeve part 12 of the second supporting frame of the third lens group and has the retraction cam face 38 for the third lens group in an outer circumference are formed. The sleeve part 12 of the second supporting frame of the third lens group and the retraction cam part 13 for the third lens group have a gap in a radial direction, and are formed in an approximately coaxial double cylinder shape and which are connected at an end part of an image plane side (a side farthest from an object), and in the gap, the compression torsion spring 14 which is extended in a direction along the main shaft 10 for the third lens group is disposed.

This compression torsion spring 14, as a compression spring, biases the sleeve part 12 of the second supporting frame of the third lens group backward along the optical axis, that is, to the image plane side (the side farthest from the object), and, as a torsion spring, biases the sleeve part 12 of the second supporting frame of the third lens group, that is, the second supporting frame 11 of the third lens group, to rotate around the main shaft 10 for the third lens group as the center.

With the retraction cam part 13 for the third lens group, the nut 15 with the cam follower 15a engages, and in the nut 15 with the cam follower 15a, the lead screw 16 which is arranged parallel to the optical axis is screwed. The lead screw 16 is supported rotatably. The drive gear 17 of the third lens group 3 is fixed with the lead screw 16. The drive gear 17 of the third lens group is connected with a rotation drive source such as a pulse motor, which is not illustrated. When the pulse motor rotates, the lead screw 16 rotates and the nut 15 with the cam follower 15a moves along the optical axis direction. In the retracted and stored state as illustrated in FIGS. 9, 11 and 14, the nut 15 with the cam follower 15a is in a position closest to the image plane (the side farthest from the object). When the nut 15 with the cam follower 15a moves to the object side, the second supporting frame 11 of the third lens group rotates in a direction to move the third lens group 3 closer to the optical axis, by the compression torsion spring 14 and the retraction cam part 13 for the third lens group.

As illustrated in FIGS. 12, 15, 17 and 18, the second supporting frame 11 of the third lens group is locked by the second shaft 37 for the third lens group which extends parallel to the optical axis, and its rotation is stopped. When the nut 15 with the cam follower 15a moves further along the optical axis direction to the object side, and the cam follower 15a which is provided with the nut 15 contacts the nut engaging part 18 for the third lens group which is at an end part on the object side of the retraction cam part 13 for the third lens group and the nut engaging part 18 for the third lens group is pushed to the object side, and via the second supporting frame 11 of the third lens group, the whole third lens group 3 is moved along the optical axis in the object direction.

Figure 19:
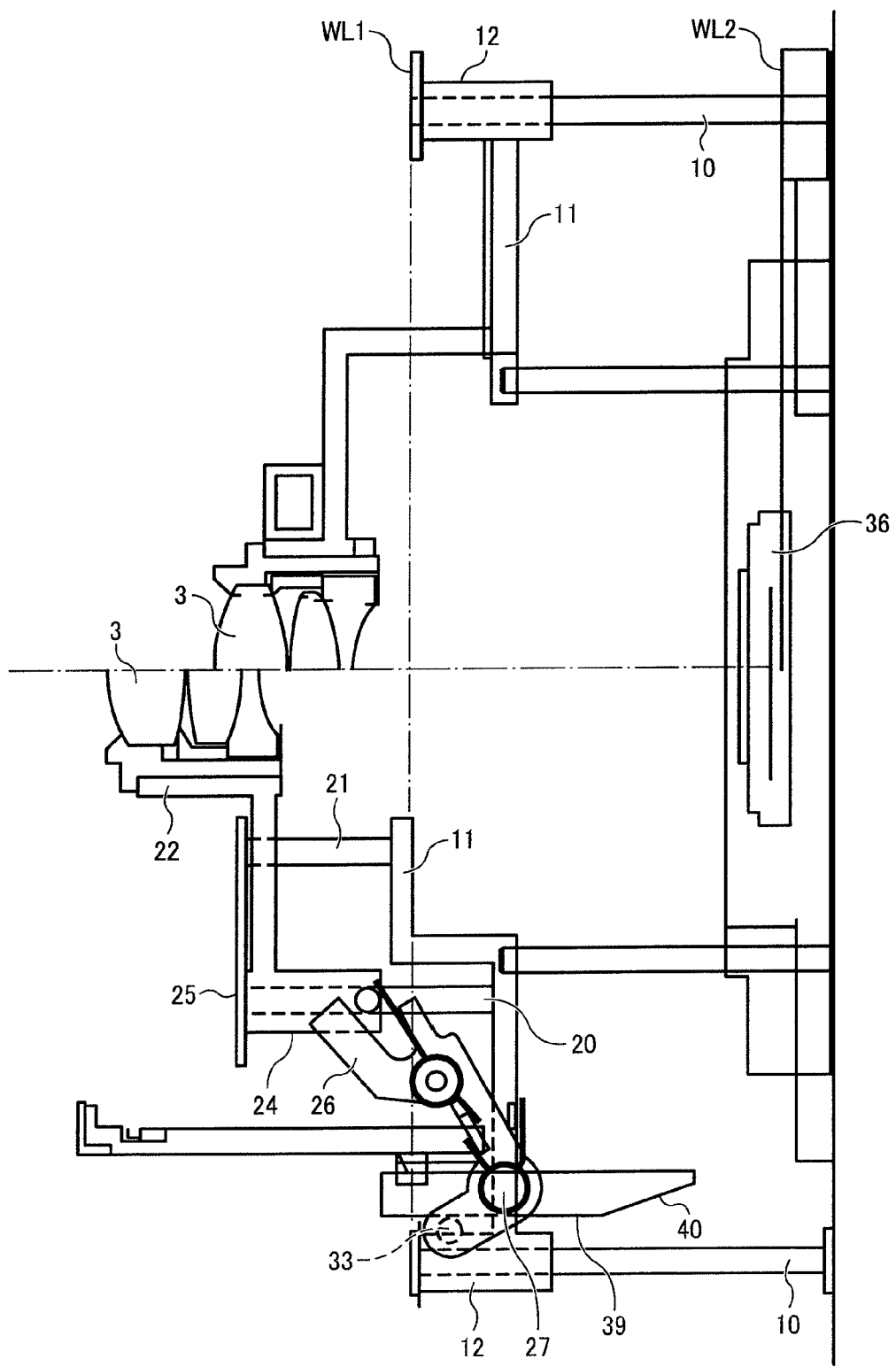
FIG. 19, where the optical axis is taken as a border, illustrates a cross section of a conventional third lens group in a state of a maximum moving state in an upper half, and a cross section of the third lens group in the lens barrel unit of FIG. 1 in the maximum moving state in a lower half.

The structure having been explained so far is approximately equivalent to the conventional structure disclosed in Japanese patent application publication number 2006-330657. A comparison of the conventional structure to the one according to the present invention is illustrated in FIG. 19. An upper half of FIG. 19 illustrates a cross section in a maximum moving state of the conventional third lens group. Conventionally, a maximum moving range of the third lens group 3 has been a range from a position (WL2 in FIG. 19) where the third lens group 3 is retracted in the optical axis direction to a position (WL1 in FIG. 19) corresponding to a maximum range where the sleeve part 12 of the second supporting frame of the third lens group moves to the object side on the main shaft 10 for the third lens group. Generally, to achieve a zoom lens with a high variable magnification, it is necessary to increase a moving range to the object side. As for techniques disclosed in Japanese patent application publication number 2006-330657 etc., variable magnifications of a zoom lens are defined by the moving range of the third lens group 3.

The present invention enables to increase the moving range of the third lens group 3 and to achieve the high variable magnification and so on.

In the lens barrel unit according to an embodiment of the present invention illustrated in FIGS. 1 to 18, as illustrated in FIGS. 2, 3, 5, 7, 9, and 11 to 18, the third lens group 3 is retained by the third lens group holder 19 which is in a cylinder shape. The third lens group holder 19 is retained by the first supporting frame 22 of the third lens group. The first supporting frame 22 of the third lens group is inserted in the main shaft 20 for the first supporting frame of the third lens group and the second shaft 21 for the first supporting frame of the third lens group. The main shaft 20 for the first supporting frame of the third lens group and the second shaft 21 for the first supporting frame of the third lens group are provided in the second supporting frame 11 of the third lens group and extend in a direction parallel to the optical axis. The first supporting frame 22 of the third lens group has the sleeve part 24 of the first supporting frame of the third lens group having a hollow cylinder shape, and the sleeve part 24 of the first supporting frame of the third lens group is inserted in the main shaft 20 for the first supporting frame of the third lens group, so that the first supporting frame 22 of the third lens group is capable of moving along in the optical axis direction. The main shaft 20 for the first supporting frame of the third lens group and the second shaft 21 for the first supporting frame of the third lens group are fixed on a common retainer plate 25 in a front end in the optical axis direction, that is, in an end part of the object side. When the first supporting frame 22 of the third lens group moves to the object side, the sleeve part 24 of the first supporting frame of the third lens group contacts the retainer plate 25 and is stopped, and thereby the third lens group 3 is in a state where the third lens group 3 is moved closest to the object side in regard to the second supporting frame 11 of the third lens group. On the contrary, when the first supporting frame 22 of the third lens group moves to an image plane side which is distant from an object, the sleeve part 24 of the first supporting frame of the third lens group contacts the second supporting frame 11 of the third lens group and is stopped, and thereby the third lens group 3 is in a state where the third lens group 3 is moved closest to the image plane side in regard to the second supporting frame 11 of the third lens group.

Figure 20:
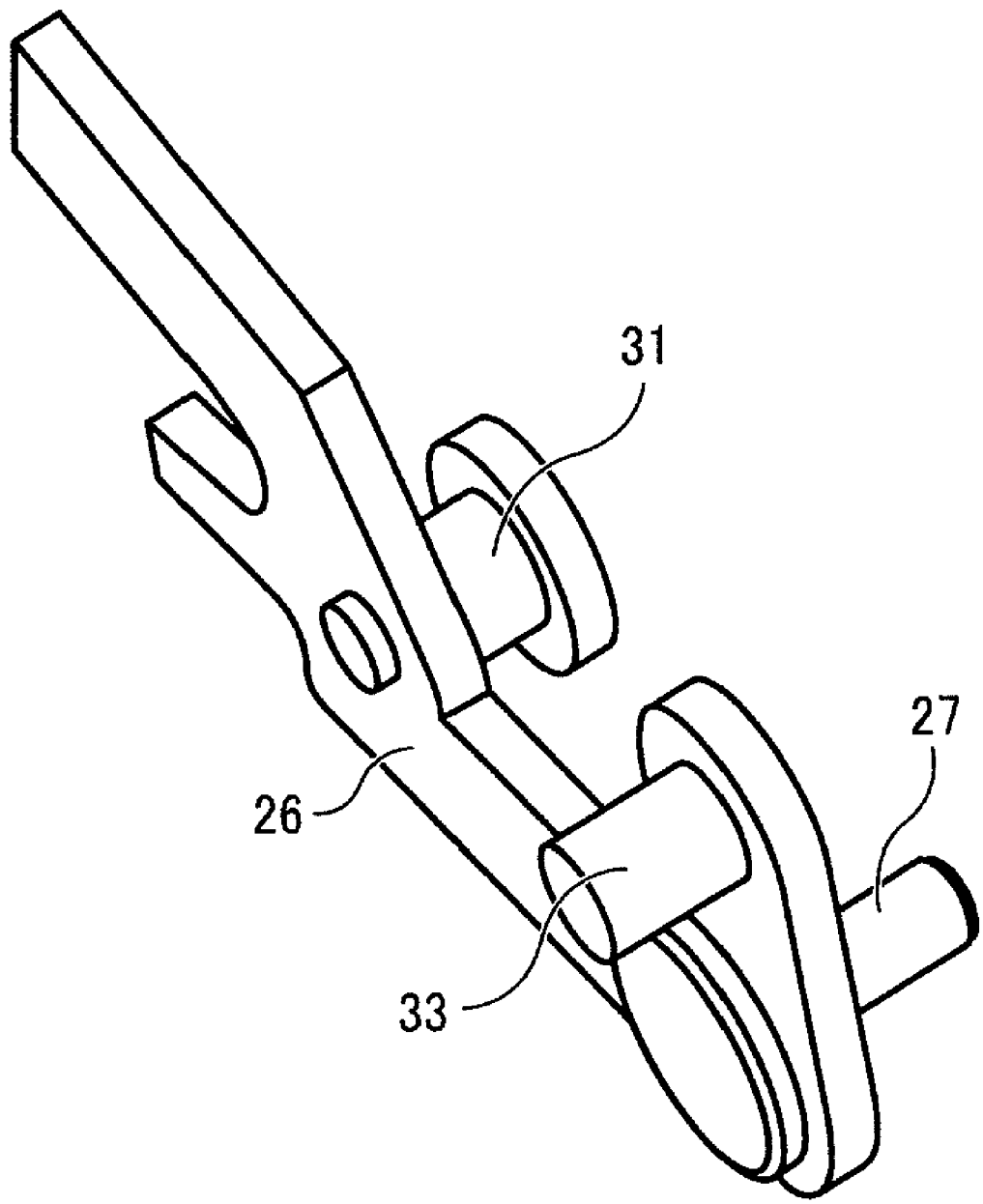
FIG. 20 is a perspective view illustrating a detailed structure of the lever 26 in the lens barrel unit of FIG. 1.

As illustrated in FIGS. 2 to 7, and 11 to 18, in the second supporting frame 11 of the third lens group, the lever 26 which is rotatable in a plane parallel to a vertical plane including the optical axis is retained. FIG. 20 is a perspective view illustrating a detailed structure of the lever 26 according to this embodiment. The lever 26 is retained rotatably around the lever rotating shaft 27. The lever rotating shaft 27 is fixed on the second supporting frame 11 of the third lens group. And the lever 26 is interposed between a head part having a large diameter of the lever rotating shaft 27 and the second supporting frame 11 of the third lens group. Around the lever rotating shaft 27, the first torsion spring 28, as largely illustrated in FIG. 6, is provided. And the first torsion spring 28 respectively engages with the lever 26 and the second supporting frame 11 of the third lens group, and biases the lever 26 in a clockwise direction in FIG. 4. In an upper end part of the lever 26, the contacting part 30 which contacts the contacting projection 29 provided with the sleeve part 24 of the first supporting frame of the third lens group is formed. Between the contacting part 30 of the lever 26 and the lever rotating shaft 27, the retaining shaft 31 of the second torsion spring (see FIGS. 17 and 20) is fixed, and the second torsion spring 32 is disposed around the retaining shaft 31 of the second torsion spring.

One end of the second torsion spring 32 contacts the lever 26 and the other end of the second torsion spring 32 presses the contacting projection 29 from behind (image plane side). Due to a pressing force of the second torsion spring 32, the contacting projection 29 is always in a state of contacting the contacting part 30. By the above structure, the contacting part 30 contacts the contacting projection 29, and thereby the first supporting frame 22 of the third lens group is capable of moving in regard to the second supporting frame 11 of the third lens group. In the lever 26, the locking part 35 having an arbitrary interval to the contacting part 30 and facing the contacting part 30 is provided. In a case where a strong force by a fall etc. is given to the first supporting frame 22 of the third lend group, when the contacting projection 29 moves in the right direction in FIG. 6 against the second torsion spring 32, and the locking part 35 catches the contacting projection 29 and maintains a positional relationship between the contacting projection 29 and the contacting part 30. Due to the above structure of the lever 26, when the lever 26 does not move, the first supporting frame 22 of the third lens group is in a closest position to the image plane side, and when the lever 26 rotates in a counterclockwise direction, the first supporting frame 22 of the third lens group moves to the object side in regard to the second supporting frame 11 of the third lens group.

As illustrated in FIGS. 5 to 7, when the first supporting frame 22 of the third lens group reaches at a maximum moving position and the sleeve part 24 of the first supporting frame of the third lens group contacts the retainer plate 25, a further movement of the first supporting frame 22 of the third lens group in regard to the second supporting frame 11 of the third lens group is controlled.

Next, a mechanism which gives the rotational force to the lever 26 will be explained.

In a lower end part of the lever 26, the cam follower 33 (see FIGS. 3 to 7 and 20) which projects in a direction perpendicular and horizontal to the optical axis is provided. The cam follower 33 is located closer to the object side than to the lever rotating shaft 27. In the fixed cylinder 6, as illustrated in FIGS. 2 to 7, and 10, the cam face 34 which contacts the cam follower 33 is formed, and as illustrated in FIGS. 3 to 7, when the second supporting frame 11 of the third lens group moves to the object side, the cam follower 33 contacts the cam face 34. The cam face 34, in an end part on the image plane side, from the end part toward an intermediate part, forms the inclined face 40 of the cam part which forms an inclined face where a distance from the optical axis gradually increases. By the inclined face 40 of the cam part, as the second supporting frame 11 of the third lens group moves to the object side, the cam follower 33 rotates around the lever rotating shaft 27 in the counterclockwise direction in FIG. 4. Thus, the lever 26 rotates by the movement of the second supporting frame 11 of the third lens group to the object side.

The cam face 34 additionally has the face 39 parallel to the optical axis. As illustrated in FIGS. 5 and 6, the inclined face 40 of the cam part is located in a side end part on the image plane side of the cam face 34, and is formed to move to a position where the sleeve part 24 of the first supporting frame of the third lens group contacts the retainer plate 25 and is stopped, in a case where the cam follower 33 reaches the face 39 parallel to the optical axis.

And when the second supporting frame 11 of the third lens group moves further along the optical axis direction, as illustrated in FIG. 7, the cam follower 33 slides on the face 39 parallel to the optical axis of the cam face 34. As illustrated in FIGS. 5 to 7, while the cam follower 33 slides on the face 39 parallel to the optical axis of the cam face 34, a state where the sleeve part 24 of the first supporting frame of the third lens group contacts the retainer plate 25 is maintained, and a state where a contact of the contacting projection 29 and the contacting part 30 is released (a state where the contacting projection 29 does not contact the contacting part 30) is maintained.

While the cam follower 33 is located on the inclined face 40 of the cam part, the moving range of the third lens group 3 is a range that a moving range of the first supporting frame 22 of the third lens group corresponding to a rotation amount (rotation angle) of the lever 26 is added to a moving range of the sleeve part 12 of the second supporting frame of the third lens group on the main shaft 10 for the third lens group. Incidentally, due to an influence of a variability of the rotation amount of the lever 26 and an accuracy of the inclined face 40 of the cam part, there is a possibility of a variability of position occurring in the optical axis direction of the third lens group 3.

On the other hand, when the cam follower 33 is on the face 39 parallel to the optical axis of the cam face 34, the first supporting frame 22 of the third lens group mechanically contacts the retainer plate 25, so that a position in the optical axis direction of the first supporting frame 22 of the third lens group to the second supporting frame 11 of the third lens group is stabilized. A positional accuracy of the second supporting frame 11 of the third lens group depends on a positional accuracy of the nut 15 with the cam follower 15a, therefore when the cam follower 33 is on the cam face 34, the position in the optical direction of the third lens group 3 is stable as in a case of the structure disclosed in Japanese patent application publication number 2006-330657.

In a case where the movement of the third lens group 3 contributes to focusing, a positional deviation in the optical axis direction of the third lens group 3 causes a focal shift, therefore a photographing range may be a range where the cam follower 33 is located on the face 39 parallel to the optical axis. On the other hand, in a case where a range where the cam follower 33 is located on the inclined face 40 of the cam part is included in the photographing range, a zoom position where a correction amount is small in a case where the fourth lens group 4 corrects an amount of the positional deviation of the third lens group 3 is preferable. For example, in the present embodiment, it is a wide-angle position.

Thus, in the present embodiment, the moving range of the third lens group 3 is also greatly obtained, so that it is not necessary to increase power (refracting power) of the third lens group 3, and it is possible to decrease the positional deviation in the optical axis direction of the third lens group 3, a plane tilt, and a degradation of an image on a plane where the optical axis intersects perpendicularly.

In addition, the inclined face 40 of the cam part is arranged on the image plane side, so that a compression amount of the compression torsion spring 14 is small, and the lever 26 receives the rotation force in a state where the compression and repulsion force is small, therefore the force to move the second supporting frame 11 of the third lens group to the object side may be small. And a moving load on the face 39 parallel to the optical axis in a state where the cam follower 33 contacts the face 39 parallel to the optical axis is only frictional force. Therefore, as a case disclosed in Japanese patent application publication number 2008-90201, it is not necessary for the lever 26 to rotate in a state where the repulsion force of the compression torsion spring 14 is maximum, and after the lever 26 rotates, it is only necessary for the drive force for the lead screw 16 to be larger than the frictional force of the cam follower 33 and the cam face 34, so that the drive force for the lead screw 16 may be small.

FIG. 19, where the optical axis is taken as a border, illustrates a cross section of a conventional third lens group in a state of a maximum moving state as disclosed in Japanese patent application publication number 2006-330657 in an upper half, and a cross section of the third lens group in the lens barrel unit of FIG. 1 in the maximum moving state in a lower half. As is clear from FIG. 19, according to the embodiment of the present invention, the maximum moving range of the third lens group 3 is increased compared to the conventional structure.

Moreover, a lens barrel unit using the drive mechanism as described above is capable of achieving a high variable magnification without increasing a thickness of a lens barrel part, that is, a length in the optical axis direction, therefore by using the above lens barrel unit, it is possible to structure an imaging apparatus such as a camera which is compact and has a high stability of a point of focus and so on.

Furthermore, in an imaging apparatus such as a camera using the above lens barrel unit, in a zoom position where the cam follower 33 is located on the inclined face 40 of the cam part, a position in the optical axis direction of the third lens group 3 is adjusted in a predetermined position per each imaging apparatus, and information on the position is memorized in a memory device, and when photographing, the third lens group 3 is moved to the position based on the information memorized in the memory device. In this way, it is possible to remove influences on sizes and a variability of mounting positions of components such as the fixed cylinder 6 and the lever 26, and thereby the movement of the imaging apparatus is stabilized.

The present invention is capable of being applied to not only a lens system contributing to zooming such as the above third lens group 3 but also a focusing lens system. For example, in a case where the present invention is applied to the fourth lens group as the focusing lens, a moving range of the fourth lens group is greatly obtained, and thereby it is possible to widen an adjustable focus range and shorten a shortest photographing distance. Thus, it is possible to provide an imaging apparatus which excels in macro photography for a photographic subject at a near distance.

An embodiment of the present invention provides a lens barrel unit and an imaging apparatus which are capable of ensuring a moving range of at least one lens group movable in an optical axis direction, without increasing a thickness in the optical axis direction, and improving an optical performance by suppressing a variability of a position of the lens group.

According to an embodiment of the present invention, it is possible to set a rotation amount of the lever by a position on the cam face and control a moving range of the first supporting frame of the third lens group. Therefore, it is possible to ensure a moving range of at least one movable lens group, without increasing a thickness in the optical axis direction of the lens barrel, and improve an optical performance and enhance a positional accuracy of the lens group, by a comparatively simple structure.

According to an embodiment of the present invention, in a case where the lens group retained by the first supporting frame of the third lens group is set to the photographing state from the collapsed state, the cam follower slides on the inclined face, so that it is possible to effectively enhance a positional accuracy of at least one movable lens group and improve an optical performance.

According to an embodiment of the present invention, in a case where the lens group retained by the first supporting frame of the third lens group is in the collapsed state, the cam follower is spaced from the cam face, so that regardless of a variability of a position and a size of each part, it is possible to ensure a stable position of at least one movable lens group.

According to an embodiment of the present invention, the lens group retained by the first supporting frame of the third lens group is a lens group which performs a focusing of a whole of the lens groups by a movement in the optical axis direction of the lens barrel, so that it is possible to improve a focusing performance.

According to an embodiment of the present invention, the first supporting frame of the third lens group is always moved and the lever rotates when retracted, and an engagement with the lever is released and the first supporting frame of the third lens group mechanically contacts the retainer plate when the first supporting frame of the third lens group is in a maximum moving state in regard to the second supporting frame of the third lens group. Therefore, regardless of a variability of a position and a variability of a size of each part, it is possible to ensure a stable position and move at least one movable lens group by a small drive force.

According to an embodiment of the present invention, it is possible to improve a movement stability.

According to an embodiment of the present invention, a rotation amount of the lever is set by a distance from the optical axis of the cam face of the fixed cylinder and a displacement in the optical axis direction of at least one movable lens group, and a moving range of the first supporting frame of the third lens group is controlled, and when moving in the optical axis direction by the cam face, a force is transmitted to an end part closer to the lever rotating shaft of the lever, and a loss of the force for rotation is suppressed. Therefore, it is possible to accurately and effectively move at least one movable lens group.

According to an embodiment of the present invention, the first supporting frame of the third lens group contacts the second supporting frame of the third lens group and moves the second supporting frame of the third lens group in the optical axis direction in a stable state. Therefore, it is possible to stably and accurately move at least one movable lens frame.

According to an embodiment of the present invention, it is possible to stabilize a position of at least one movable lens in the photographing state.

According to an embodiment of the present invention, it is possible to set a position deviation amount of the third lens group to be a zoom position where a correction amount is small in a case where the fourth lens group corrects. And it is possible to increase a moving range in the optical axis direction of at least one movable lens group, and ensure the moving range, and to achieve a high variable magnification.

According to an embodiment of the present invention, it is possible to set a rotation amount of the lever by a position on the cam face and control a moving range of the first supporting frame of the third lens group. In particular, by performing a movement in a position where an influence on a focus variation by a position deviation in the optical axis direction is small, it is possible to largely ensure a moving range in the optical axis direction of a retraction lens group necessary for the photographing state, after ensuring a stability of a point of focus. Therefore, it is possible to ensure a moving range of at least one movable lens group, without increasing a thickness in the optical axis direction of the lens barrel, and enhance a positional accuracy of the lens group and significantly improve an optical performance.

According to an embodiment of the present invention, it is possible to ensure a moving range of at least one movable lens group, without increasing a thickness in the optical axis direction of the lens barrel, and enhance a positional accuracy of the lens group and improve an optical performance such as ensuring a focus stability with a high variable magnification.

According to an embodiment of the present invention, it is possible to stably retain the second supporting frame of the third lens group.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lens barrel unit including a lens barrel which has a plurality of lens groups and is set to a photographing state by moving at least a part of the lens groups to an object side and to a collapsed state by moving the at least the part of the lens groups to an image plane side and storing the lens groups, the lens barrel unit comprising:
   a first supporting frame which retains at least one lens group of the lens groups;
   a second supporting frame which retains the first supporting frame movably in an optical axis direction of the lens barrel;
   a first supporting frame moving section which moves the first supporting frame in the optical axis direction of the lens barrel; and
   a fixed cylinder in which a main shaft which is capable of accommodating movement of the second supporting frame in the optical axis direction of the lens barrel is provided.

2. The lens barrel unit according to claim 1, wherein the first supporting frame moving section has:
   a contacting projection which is provided in the first supporting frame in a direction perpendicular to the optical axis direction of the lens barrel;
   a lever rotating shaft which is provided in the second supporting frame in a direction perpendicular to the optical axis direction of the lens barrel;
   a lever having an intermediate part which is retained rotatably by the lever rotating shaft, an upper end at which a contacting part which contacts the contacting projection is provided, and a lower end at which a cam follower which is provided in a direction perpendicular to the optical axis direction of the lens barrel is provided; and
   a cam face which is provided in the fixed cylinder and has an inclined face which contacts the cam follower and is inclined to the optical axis direction of the lens barrel,
   wherein in a case where the second supporting frame moves in the optical axis direction of the lens barrel, the cam follower slides on the inclined face and the lever rotates around the lever rotating shaft, and the contacting projection which contacts the contacting part moves in the optical axis direction of the lens barrel and the first supporting frame, in which the contacting projection is provided, moves in the optical axis direction of the lens barrel.

3. The lens barrel unit according to claim 2, wherein in a case where the lens group retained by the first supporting frame is set to the photographing state from the collapsed state, the cam follower slides on the inclined face.

4. The lens barrel unit according to claim 2, wherein the contacting projection is biased to the object side in the optical axis direction of the lens barrel by a first biasing member which is provided in the lever, and the lever is biased to an image plane side in the optical axis direction of the lens barrel by a second biasing member provided in the second supporting frame.

5. The lens barrel unit according to claim 2, wherein in the second supporting frame, a retainer plate, which controls a movement of the first supporting frame to the object side in the optical axis direction of the lens barrel by contacting the second supporting frame, is provided, and in a case where the first supporting frame contacts the retainer plate, a contact between the contacting projection and the contacting part is released.

6. The lens barrel unit according to claim 2, wherein a locking part is provided on the image plane side of the contacting part to interpose the contacting projection.

7. The lens barrel unit according to claim 2, wherein the cam follower is located closer to the object side than to the lever rotating shaft, and the inclined face has a shape such that a distance from the optical axis of the lens barrel becomes larger from the image plane side toward the object side.

8. The lens barrel unit according to claim 2, wherein the cam face is provided in the fixed cylinder, and has a flat face where the cam follower contacts and which includes the optical axis direction of the lens barrel and a direction perpendicular to the lever and is continued with the object side of the inclined face.

9. The lens barrel unit according to claim 8, wherein in the photographing state, the cam follower slides only on the flat face.

10. The lens barrel unit according to claim 8, wherein in the photographing state where a moving range of a lens group performing a focusing of the lens groups is smallest, the cam follower slides on the inclined face.

11. The lens barrel unit according to claim 2, wherein in a case where the lens group retained by the first supporting frame is in the collapsed state, the cam follower is spaced from the cam face.

12. The lens barrel unit according to claim 1, wherein the lens group retained by the first supporting frame is a lens group which performs a focusing of a whole of the lens groups by a movement in the optical axis direction of the lens barrel.

13. The lens barrel unit according to claim 1, further comprising:
    a second moving section which retracts the lens group retained by the first supporting frame from the optical axis of the lens barrel.

14. The lens barrel unit according to claim 13, wherein the second moving section has:
    a retraction cam part which is provided at a lower end of the second supporting frame and a retraction cam face is provided on a surface;
    a lead screw which is provided parallel to the main shaft below the main shaft;
    a drive gear which drives the lead screw; and
    a nut with a cam follower which is screwed in the lead screw and engages with the retraction cam face,
    wherein in a case where the lead screw is rotated by the drive gear, with a movement of the nut in the optical axis direction of the lens barrel, the cam follower moves on the retraction cam face, so that the second supporting frame where the retraction cam part is provided rotates around the main shaft in a plane perpendicular to the optical axis direction of the lens barrel.

15. The lens barrel unit according to claim 13, wherein in a case where the lens group retained by the first supporting frame is set to the photographing state from the collapsed state, the second moving section rotates the first supporting frame such that the lens group retained by the first supporting frame is set to the photographing state where the lens group retained by the first supporting frame is on the optical axis from the retracted state where the lens group retained by the first supporting frame is not on the optical axis, and in a case where the lens group retained by the first supporting frame is set to the collapsed state from the photographing state, the second moving section rotates the first supporting frame such that the lens group retained by the first supporting frame is set to the retracted state where the lens group retained by the first supporting frame is not on the optical axis from the photographing state where the lens group retained by the first supporting frame is on the optical axis.

16. The lens barrel unit according to claim 15, wherein after the lens group retained by the first supporting frame is in the photographing state, in a case where the nut moves to the object side, the nut engaging part is pushed by the cam follower to the object side, and the second supporting frame moves to the object side.

17. The lens barrel unit according to claim 14, wherein a nut engaging part in which the cam follower contacts is provided on the object side of the retraction cam part, and in a case where the lens group retained by the first supporting frame is in the photographing state, the cam follower contacts the nut engaging part.

18. The lens barrel unit according to claim 14, wherein a third biasing member which biases the second supporting frame to the image plane side is provided.

19. An imaging apparatus, comprising:
    the lens barrel unit according to claim 1.

* * * * *